(12) United States Patent
Koyama

(10) Patent No.: US 9,462,260 B2
(45) Date of Patent: Oct. 4, 2016

(54) DISPLAY DEVICE

(75) Inventor: Jun Koyama, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 773 days.

(21) Appl. No.: 13/229,934

(22) Filed: Sep. 12, 2011

(65) Prior Publication Data

US 2012/0062561 A1  Mar. 15, 2012

(30) Foreign Application Priority Data

Sep. 13, 2010 (JP) ................................. 2010-203894

(51) Int. Cl.
*H04N 13/04* (2006.01)

(52) U.S. Cl.
CPC ...... *H04N 13/0438* (2013.01); *H04N 13/0497* (2013.01)

(58) Field of Classification Search
CPC ................................................ H04N 13/0438
USPC ........................................................ 349/15
See application file for complete search history.

(56) References Cited

U.S. PATENT DOCUMENTS

| | | | |
|---|---|---|---|
| 5,731,856 A | 3/1998 | Kim et al. | |
| 5,744,864 A | 4/1998 | Cillessen et al. | |
| 6,046,787 A | 4/2000 | Nishiguchi | |
| 6,239,453 B1 | 5/2001 | Yamada et al. | |
| 6,294,274 B1 | 9/2001 | Kawazoe et al. | |
| 6,448,952 B1* | 9/2002 | Toyoda et al. | 345/97 |
| 6,563,174 B2 | 5/2003 | Kawasaki et al. | |
| 6,580,405 B1 | 6/2003 | Yamazaki et al. | |
| 6,727,522 B1 | 4/2004 | Kawasaki et al. | |
| 7,045,369 B2 | 5/2006 | Yamazaki et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |

(Continued)

FOREIGN PATENT DOCUMENTS

| | | |
|---|---|---|
| EP | 1737044 A | 12/2006 |
| EP | 2226847 A | 9/2010 |

(Continued)

OTHER PUBLICATIONS

Kamiya et al., "Carrier Transport Properties and Electronic Structures of Amorphous Oxide Semiconductors: The Present Status," Solid State Physics, Sep. 1, 2009, vol. 44, No. 9, pp. 621-633, Agne Gijutsu Center (with English translation).

(Continued)

*Primary Examiner* — Nathanael R Briggs
*Assistant Examiner* — Alexander Gross
(74) *Attorney, Agent, or Firm* — Husch Blackwell LLP

(57) ABSTRACT

An object is to provide a three-dimensional display device capable of displaying bright images with low power consumption. The display device includes: an image display portion including a pixel portion provided with a plurality of pixels; a light-blocking portion including a first shutter and a second shutter; a signal source outputting the common potential; and a controller controlling transmittances of the first shutter and the second shutter and level of the common potential output from the signal source to bring the transmittances and the level into synchronism with supply of an image signal, display of a right-eye image, or display of a left-eye image performed in the pixel portion.

25 Claims, 12 Drawing Sheets

(56) References Cited

U.S. PATENT DOCUMENTS

| | | |
|---|---|---|
| 7,211,825 B2 | 5/2007 | Shih et al |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,345,661 B2 | 3/2008 | Miyagawa et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,727,779 B2 | 6/2010 | Yamazaki et al. |
| 7,732,819 B2 | 6/2010 | Akimoto et al. |
| 8,654,114 B2 | 2/2014 | Shimizu et al. |
| 8,665,323 B2 | 3/2014 | Izawa |
| 8,773,518 B2 | 7/2014 | Kato et al. |
| 2001/0000335 A1 | 4/2001 | Yamada et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0007072 A1* | 1/2006 | Choi et al. ............... 345/76 |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0035484 A1* | 2/2007 | Chang ............... 345/76 |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0065771 A1* | 3/2009 | Iwasaki et al. ............... 257/43 |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0091207 A1* | 4/2010 | Hasegawa et al. ............. 349/15 |
| 2010/0092800 A1 | 4/2010 | Itagaki et al. |
| 2010/0109002 A1 | 5/2010 | Itagaki et al. |
| 2010/0194450 A1 | 8/2010 | Shimizu et al. |
| 2010/0221857 A1* | 9/2010 | Cok ............... 438/34 |
| 2011/0273441 A1 | 11/2011 | Shin |
| 2011/0310234 A1* | 12/2011 | Sarma ............... G09G 3/3406 348/53 |
| 2012/0007848 A1* | 1/2012 | Han et al. ............... 345/212 |
| 2012/0062539 A1 | 3/2012 | Koyama |
| 2014/0125712 A1 | 5/2014 | Shimizu et al. |

FOREIGN PATENT DOCUMENTS

| | | |
|---|---|---|
| EP | 2 387 023 A2 | 11/2011 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2007-163709 A | 6/2007 |
| JP | 2009-31523 | 2/2009 |
| JP | 2009-042664 A | 2/2009 |
| JP | 2009-128503 A | 6/2009 |
| JP | 2011-237756 A | 11/2011 |
| WO | WO-2004/114391 | 12/2004 |
| WO | WO 2009/022563 A1 | 2/2009 |
| WO | WO 2009/066627 A1 | 5/2009 |
| WO | WO 2010/082479 A1 | 7/2010 |
| WO | WO 2011/121657 A1 | 10/2011 |

OTHER PUBLICATIONS

Fortunato.E et al., "Wide-Bandgap High-Mobility ZnO Thin-Film Transistors Produced at Room Temperature,", Appl. Phys. Lett. (Applied Physics Letters) , Sep. 27, 2004, vol. 85, No. 13, pp. 2541-2543.

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04 : SID International Symposium Digest of Technical Papers, 2004, vol. 35, pp. 860-863.

(56) References Cited

OTHER PUBLICATIONS

Nomura.K et al., "Room-Temperature Fabrication of Transparent Flexible Thin-Film Transisitors Using Amorphous Oxide Semiconductors,", Nature, Nov. 25, 2004, vol. 432, pp. 488-492.
Park.J et al., "Improvements in the Device Characteristics of Amorphous Indium Gallium Zinc Oxide Thin-Film Transistors by Ar Plasma Treatment,", Appl. Phys. Lett. (Applied Physics Letters), Jun. 26, 2007, vol. 90, No. 26, pp. 262106-1-262106-3.
Takahashi.M et al., "Theoretical Analysis of IgZo Transparent Amorphous Oxide Semiconductor,", IDW '08 : Proceedings of the 15th International Display Workshops, Dec. 3, 2008, pp. 1637-1640.
Hayashi.R et al., "42.1: Invited Paper: Improved Amorphous In—Ga—Zn—O TFTs,", SID Digest '08 : SID International Symposium Digest of Technical Papers, May 20, 2008, vol. 39, pp. 621-624.
Prins.M et al., "A Ferroelectric Transparent Thin-Film Transistor,", Appl. Phys. Lett. (Applied Physics Letters) , Jun. 17, 1996, vol. 68, No. 25, pp. 3650-3652.
Nakamura.M et al., "The phase relations in the In2O3—Ga2ZnO4—ZnO system at 1350° C.,", Journal of Solid State Chemistry, Aug. 1, 1991, vol. 93, No. 2, pp. 298-315.
Kimizuka.N. et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System,", Journal of Solid State Chemistry, Apr. 1, 1995, vol. 116, No. 1, pp. 170-178.
Nomura.K et al., "Thin-Film Transistor Fabricated in Single-Crystalline Transparent Oxide Semiconductor,", Science, May 23, 2003, vol. 300, No. 5623, pp. 1269-1272.
Masuda.S et al., "Transparent thin film transistors using ZnO as an active channel layer and their electrical properties,", J. Appl. Phys. (Journal of Applied Physics) , Feb. 1, 2003, vol. 93, No. 3, pp. 1624-1630.
Asakuma.N. et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.
Osada.T et al., "15.2: Development of Driver-Integrated Panel using Amorphous In—Ga—Zn—Oxide TFT,", SID Digest '09 : SID International Symposium Digest of Technical Papers, May 31, 2009, pp. 184-187.
Nomura.K et al., "Carrier transport in transparent oxide semiconductor with intrinsic structural randomness probed using single-crystalline InGaO3(ZnO)5 films,", Appl. Phys. Lett. (Applied Physics Letters) , Sep. 13, 2004, vol. 85, No. 11, pp. 1993-1995.
Li.C et al., "Modulated Structures of Homologous Compounds InMO3(ZnO)m (M=In,Ga; m=Integer) Described by Four-Dimensional Superspace Group,", Journal of Solid State Chemistry, 1998, vol. 139, pp. 347-355.
Son.K et al., "42.4L: Late-News Paper: 4 Inch QVGA AMOLED Driven by the Threshold Voltage Controlled Amorphous GiZo (Ga2O3—In2O3—ZnO) TFT,", SID Digest '08 : SID International Symposium Digest of Technical Papers, May 20, 2008, vol. 39, pp. 633-636.
Lee.J et al., "World'S Largest (15-Inch) XGA AMLCD Panel Using IgZo Oxide TFT,", SID Digest '08 : SID International Symposium Digest of Technical Papers, May 20, 2008, vol. 39, pp. 625-628.
Nowatari.H et al., "60.2: Intermediate Connector With Suppressed Voltage Loss for White Tandem OLEDs,", SID Digest '09 : SID International Symposium Digest of Technical Papers, May 31, 2009, vol. 40, pp. 899-902.
Kanno.H et al., "White Stacked Electrophosphorecent Organic Light-Emitting Devices Employing MOO3 As a Charge-Generation Layer,", Adv. Mater. (Advanced Materials), 2006, vol. 18, No. 3, pp. 339-342.
Tsuda.K et al., "Ultra Low Power Consumption Technologies for Mobile TFT-LCDs ,", IDW '02 : Proceedings of The 9th International Display Workshops, Dec. 4, 2002, pp. 295-298.
Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn-O TFTs for Flat Panel Displays,", AM-FPD '08 Digest of Technical Papers, Jul. 2, 2008, pp. 251-252, The Japan Society of Applied Physics.
Jeong.J et al., "3.1: Distinguished Paper: 12.1-Inch WXGA AMOLED Display Driven by Indium—Gallium—Zinc Oxide TFTs Array,", SID Digest '08 : SID International Symposium Digest of Technical Papers, May 20, 2008, vol. 39, No. 1, pp. 1-4.
Park.J et al., "High performance amorphous oxide thin film transistors with self-aligned top-gate structure,", IEDM 09: Technical Digest of International Electron Devices Meeting, Dec. 7, 2009, pp. 191-194.
Kurokawa.Y et al., "UHF RFCPUS on Flexible and Glass Substrates for Secure RFID Systems,", Journal of Solid-State Circuits, 2008, vol. 43, No. 1, pp. 292-299.
Ohara.H et al., "Amorphous In—Ga—Zn—Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.
Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.
Cho.D et al., "21.2:Al and Sn-Doped Zinc Indium Oxide Thin Film Transistors for AMOLED Back-Plane,", SID Digest '09 : SID International Symposium Digest of Technical Papers, May 31, 2009, pp. 280-283.
Lee.M et al., "15.4:Excellent Performance of Indium—Oxide-Based Thin-Film Transistors by DC Sputtering,", SID Digest '09 : SID International Symposium Digest of Technical Papers, May 31, 2009, pp. 191-193.
Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.
Sakata.J et al., "Development of 4.0-In. AMOLED Display With Driver Circuit Using Amorphous In—Ga—Zn—Oxide TFTs,", IDW '09 : Proceedings of the 16th International Display Workshops, 2009, pp. 689-692.
Park.J et al., "Amorphous Indium—Gallium—Zinc Oxide TFTs and Their Application for Large Size AMOLED,", AM-FPD '08 Digest of Technical Papers, Jul. 2, 2008, pp. 275-278.
Park.S et al., "Challenge to Future Displays: Transparent AM-OLED Driven by PEALD Grown ZnO TFT,", IMID '07 Digest, 2007, pp. 1249-1252.
Godo.H et al., "Temperature Dependence of Characteristics and Electronic Structure for Amorphous In—Ga—Zn—Oxide TFT,", AM-FPD '09 Digest of Technical Papers, Jul. 1, 2009, pp. 41-44.
Osada.T et al., "Development of Driver-Integrated Panel Using Amorphous In—Ga—Zn—Oxide TFT,", AM-FPD '09 Digest of Technical Papers, Jul. 1, 2009, pp. 33-36.
Hirao.T et al., "Novel Top-Gate Zinc Oxide Thin-Film Transistors (ZnO TFTs) for AMLCDS,", Journal of the SID, 2007, vol. 15, No. 1, pp. 17-22.
Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.
Godo.H et al., "P-9:Numerical Analysis on Temperature Dependence of Characteristics of Amorphous In—Ga—Zn—Oxide TFT,", SID Digest '09 : SID International Symposium Digest of Technical Papers, May 31, 2009, pp. 1110-1112.
Ohara.H et al., "21.3:4.0 In. QVGA AMOLED Display Using In—Ga—Zn—Oxide TFTs With a Novel Passivation Layer,", SID Digest '09 : SID International Symposium Digest of Technical Papers, May 31, 2009, pp. 284-287.
Miyasaka.M, "SUFTLA Flexible Microelectronics on Their Way to Business,", SID Digest '07 : SID International Symposium Digest of Technical Papers, 2007, vol. 38, pp. 1673-1676.
Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

(56) References Cited

OTHER PUBLICATIONS

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

Asaoka.Y et al., "29.1: Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED ,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N et al., "Spinel,YbFe2O4, and Yb2Fe3O7 Types of Structures for Compounds in the In2O3 and Sc2O3—A2O3—Bo Systems [A; Fe, Ga, or Al; B: Mg, Mn, Fe, Ni, Cu,or Zn] At Temperatures Over 1000° C.,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium—Gallium—Zinc Oxide Semiconductor Upon Exposure to Water,", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters) , 2005, vol. 87, pp. 122102-1-122102-3.

Oba.F et al., "Defect energetics in ZnO: A hybrid Hartree-Fock density functional study,", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator,", Appl. Phys. Lett. (Applied Physics Letters), Sep. 1, 2003, vol. 83, No. 9, pp. 1755-1757.

* cited by examiner

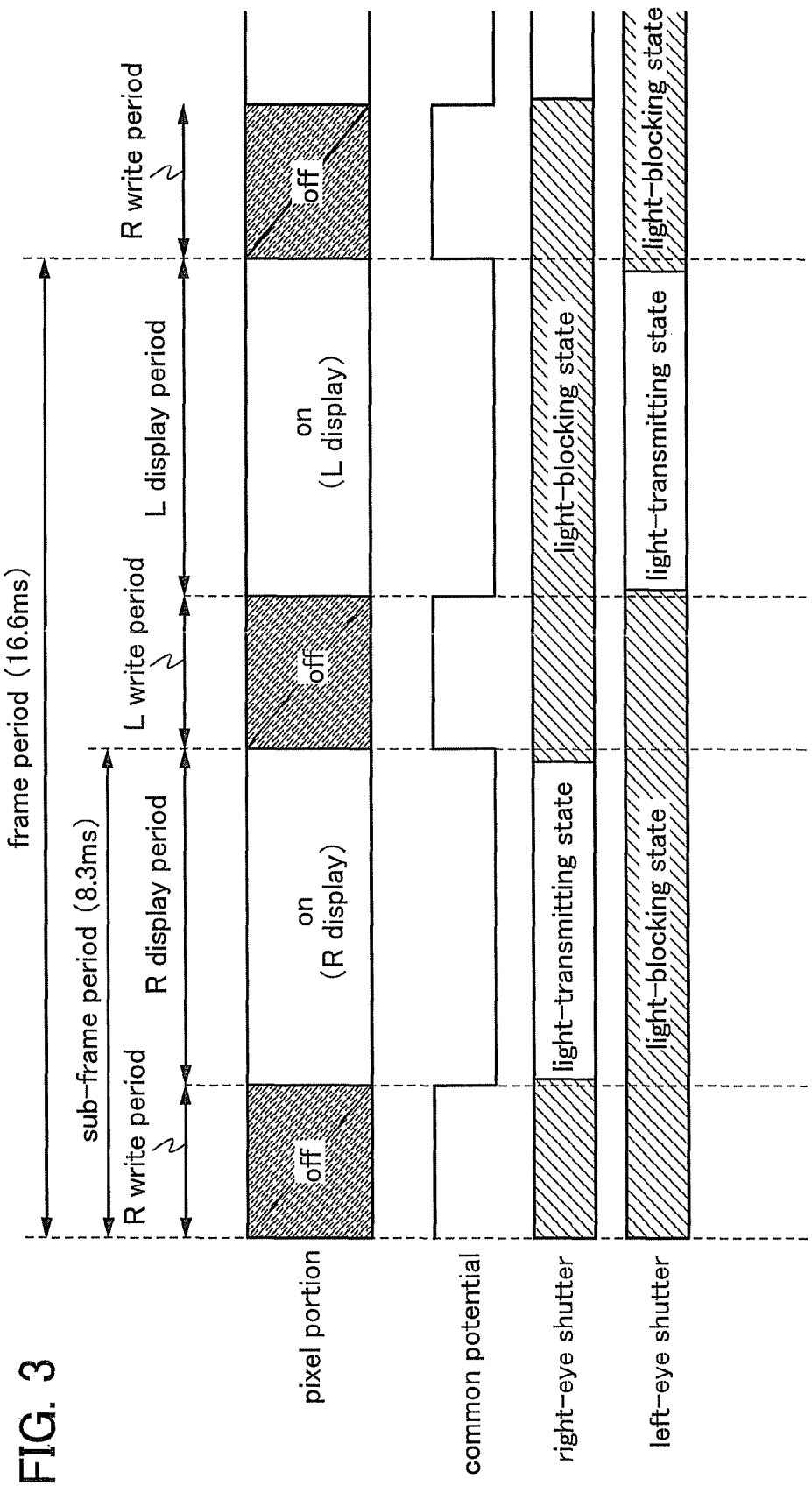

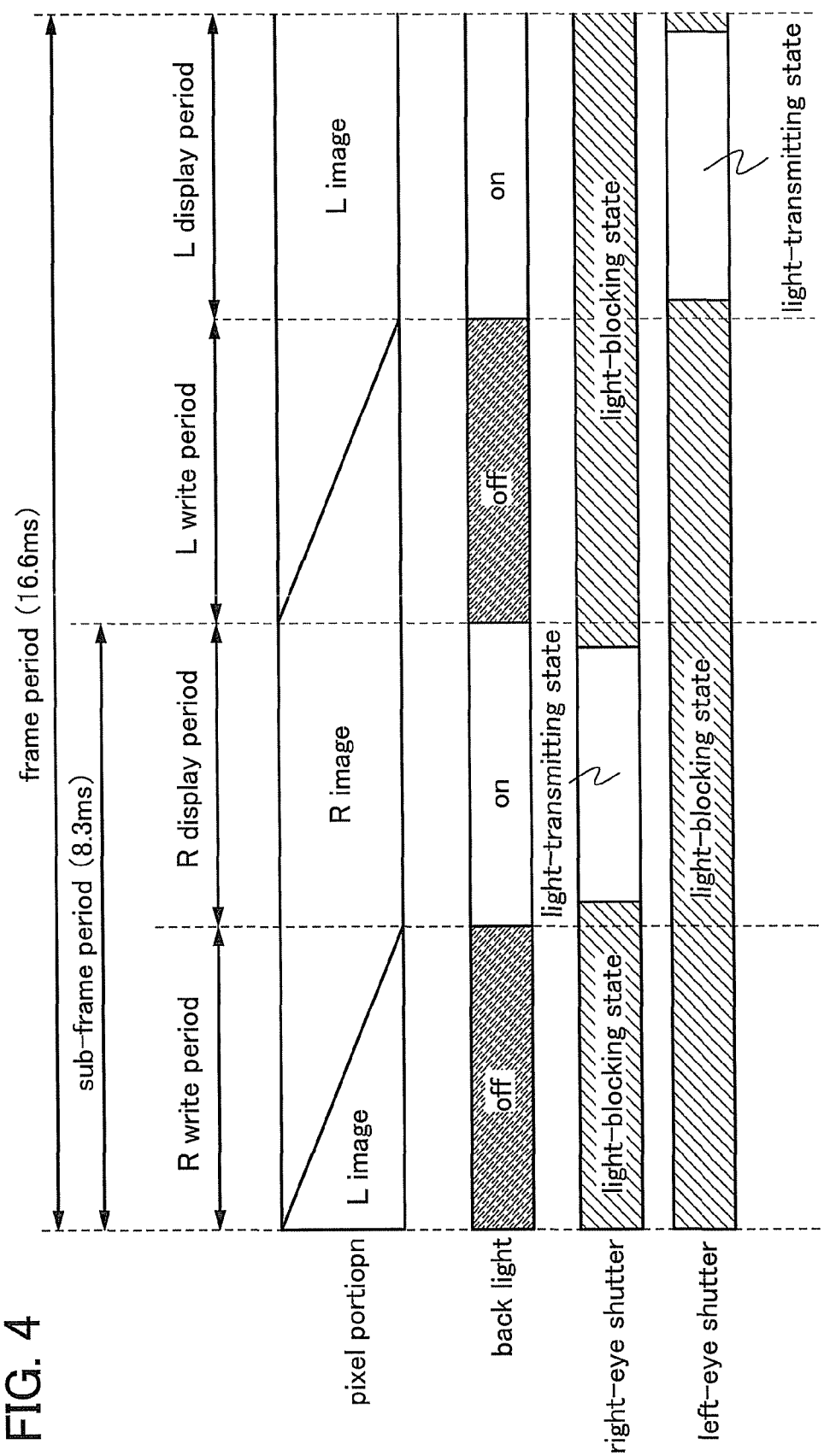

DISPLAY DEVICE

BACKGROUND OF THE INVENTION

1. Field of the Invention

One embodiment of the present invention relates to a display device displaying three-dimensional images.

2. Description of the Related Art

The market for three-dimensional display devices are growing. Displaying a three-dimensional image can be achieved by artificially creating, with a display device, difference between retinal images of both eyes (binocular parallax) which may occur when the viewer sees a stereoscopic object with both eyes. Three-dimensional display devices using such binocular parallax, for which a variety of driving methods have been developed, are going commercial. Currently, liquid crystal display devices using a frame sequential method are mainstream devices in the market.

The frame sequential method is a driving method used to show three-dimensional images to the viewer's eyes by displaying alternately a left-eye image and a right-eye image on, a screen and showing them to the viewer through shutter glasses. In other words, when a display device displays a left-eye image, the glasses increase the transmittance of the left-eye shutter and transmit this image to the left eye of the viewer. In contrast, when the display device displays a right-eye image, the glasses increase the transmittance of the right-eye shutter and transmit this image to the right eye of the viewer. Thus, the viewer sees left-eye images with left eye and right-eye images with right eye, thereby seeing three-dimensional images.

Patent Document 1 discloses a frame sequential liquid crystal display device.

REFERENCE

Patent Document

[Patent Document 1] Japanese Published Patent Application No. 2009-031523

SUMMARY OF THE INVENTION

The above-stated frame sequential liquid crystal display device displays a left-eye image and a right-eye image in the mix on a pixel portion during a period during which image signals are supplied to the pixel portion (a write period). If the right-eye or left-eye shutter of the glasses transmits light during the write period, a phenomenon called cross talk in which a left-eye image enters the right eye or a right-eye image enters the left eye occurs, which prevents the viewer from seeing three-dimensional images. Bringing both the right-eye shutter and the left-eye shutter of the glasses into a light-blocking state during the write period is effective in avoiding cross talk.

However, for liquid crystal, response time from when an applied voltage is changed to when changes in the alignment of molecules converge is approximately ten and several milliseconds in general, but one frame period is approximately 16.6 ms when a liquid crystal display device is driven at a frame frequency of 60 Hz. This means that the write period accounts for a great proportion of one frame period. Therefore, if both the right-eye shutter and the left-eye shutter are brought into a light-blocking state during the write period to avoid cross talk, the time that the glasses takes to pass light from the pixel portion is shortened, which darkens a displayed image. Even if the brightness of the displayed image is ensured by increasing the luminance of a backlight, power consumption is increased.

In view of the above problem, an object of one embodiment of the present invention is to provide a three-dimensional display device capable of displaying bright images with low power consumption.

The inventor thought that the write period could be shortened by using a light emitting element such as an organic light emitting diode (OLED) which has higher response speed than a liquid crystal element. However, simply replacing a liquid crystal element with a light emitting element facilitates the occurrence of cross talk. The reason will be described below.

The shutters of the glasses are elements whose transmittances can be controlled by supply of current or voltage, such as liquid crystal elements. These shutters using, for example, normally-black liquid crystal elements, ideally exhibit a transmittance of 0% during no voltage is applied. In reality, however, the transmittance does not become completely 0% depending on the wavelength of light and slight light passes the shutters sometimes. Consequently, during the write period in which a left-eye image and a right-eye image are mixed on the pixel portion, slight cross talk in which a left-eye image enters the right eye or a right-eye image enters the left eye occurs, preventing the viewer from seeing three-dimensional images.

In the case of use of liquid crystal elements for the pixel portion of the display device, slight light that has passed the shutters during the write period can be prevented from reaching the eyes of the viewer by turning off the backlight. However, since a light emitting element is an element whose luminance is controlled by the supply of an image signal, in the case of use of light emitting elements for the pixel portion of the display device, a left-eye image and a right-eye image are mixed on the pixel portion during the write period. Therefore, use of light emitting elements facilitates the occurrence of cross talk more greatly than use of liquid crystal elements.

Further, in the case of use of liquid crystal elements for the shutters of the glasses, time from when an applied voltage changes to when changes in transmittance converge is made longer because the response speed of liquid crystal elements is low. Therefore, in order to avoid cross talk, it is important to, during the write period, bring the shutters of the glasses into a light-blocking state and prevent a left-eye image and a right-eye image from being mixed on the pixel portion.

In the case of use of light emitting elements, supplying such image signals that the light emitting elements are turned off, which are used to display a black image, to the pixel portion can prevent a left-eye image and a right-eye image from being mixed on the pixel portion, thereby avoiding cross talk. However, in the case of use of this driving method, it is necessary to switch the transmittance between the left-eye shutter and the right-eye shutter from when supply of image signals used to display a black image to all the pixels within the pixel portion is finished to when supply of the next left-eye or right-eye image signals is started. In addition, the write period for image signals used to display a black image has the same length as the write period for normal image signals. Therefore, focusing on a given pixel in the case of use of the above-stated driving method, the light emitting element is off during both the above-stated period needed for switching the shutter transmittance and the period for supplying image signals used to display a black image. This reduces the ratio of the period during which the light emitting elements are on in one frame period, i.e. the duty cycle that is the ratio of a display period in one frame period, which makes it difficult to achieve an object of one embodiment of the present invention, i.e. a display device capable of displaying bright images with low power consumption.

In view of this, in one embodiment of the present invention, the potential of a common electrode included in a light emitting element is controlled by a signal source. Specifically, the common electrode potential is switched between the write period for supplying image signals and the display period for displaying an image. Note that a light emitting element refers to a stack of a pixel electrode whose potential is controlled by an image signal, an electroluminescent layer of an electroluminescent material which can produce electroluminescence which is generated by the application of electric field, and a common electrode. Consequently, as stated above, switching the common electrode potential by using the signal source forces the light emitting elements in all the pixels to be off during the write period, and allows the light emitting elements in all the pixels to turn on in response to image signals during the display period.

The above-mentioned system eliminates the need for a conventional way to turn off the light emitting elements that is to supply image signals used to display a black image to the pixels. In other words, the light emitting elements in all the pixels can be turned off concurrently by a different type of signal from the image signal. Thus, the light emitting elements can be kept off during the period for supplying image signals.

Specifically, a display device according to one embodiment of the present invention includes: an image display portion including a pixel portion provided with a plurality of pixels; a light-blocking portion including a first shutter and a second shutter; a signal source outputting the common potential; and a controller controlling transmittances of the first shutter and the second shutter and level of the common potential output from the signal source to bring the transmittances and the level into synchronism with supply of an image signal, display of a right-eye image, or display of a left-eye image performed in the pixel portion. The plurality of pixels each includes: a switching transistor controlling supply of an image signal to the pixel; a light emitting element including a pixel electrode, a common electrode supplied with a common potential, and an electroluminescent layer provided between the pixel electrode and the common electrode; and a drive transistor controlling a potential of the pixel electrode in accordance with the image signal.

In one embodiment of the present invention, the use of light emitting elements reduces the ratio of the write period in one frame period. Further, controlling the potential of a common electrode included in a light emitting element by using the signal source forces all the light emitting elements within the pixel portion to be off during the period for supplying right-eye or left-eye image signals. In addition, the transmittance can be switched between the left-eye shutter and the right-eye shutter during the write period. Consequently, the duty cycle that is the ratio of a display period in one frame period can be made higher than that in a conventional display device without cross talk. Thus, a display device capable of displaying bright images with low power consumption can be achieved.

BRIEF DESCRIPTION OF THE DRAWINGS

FIG. 3 is a timing diagram of operation of a display device.

FIG. 4 is a timing diagram of operation of a liquid crystal display device.

DETAILED DESCRIPTION OF THE INVENTION

Hereinafter, embodiments of the present invention will be described in detail with reference to the accompanying drawings. It will be readily appreciated by those skilled in the art that modes and details of the present invention can be modified in various ways without departing from the spirit and scope of the present invention. The present invention therefore should not be construed as being limited to the following description of the embodiments.

Embodiment 1

Figure 1:
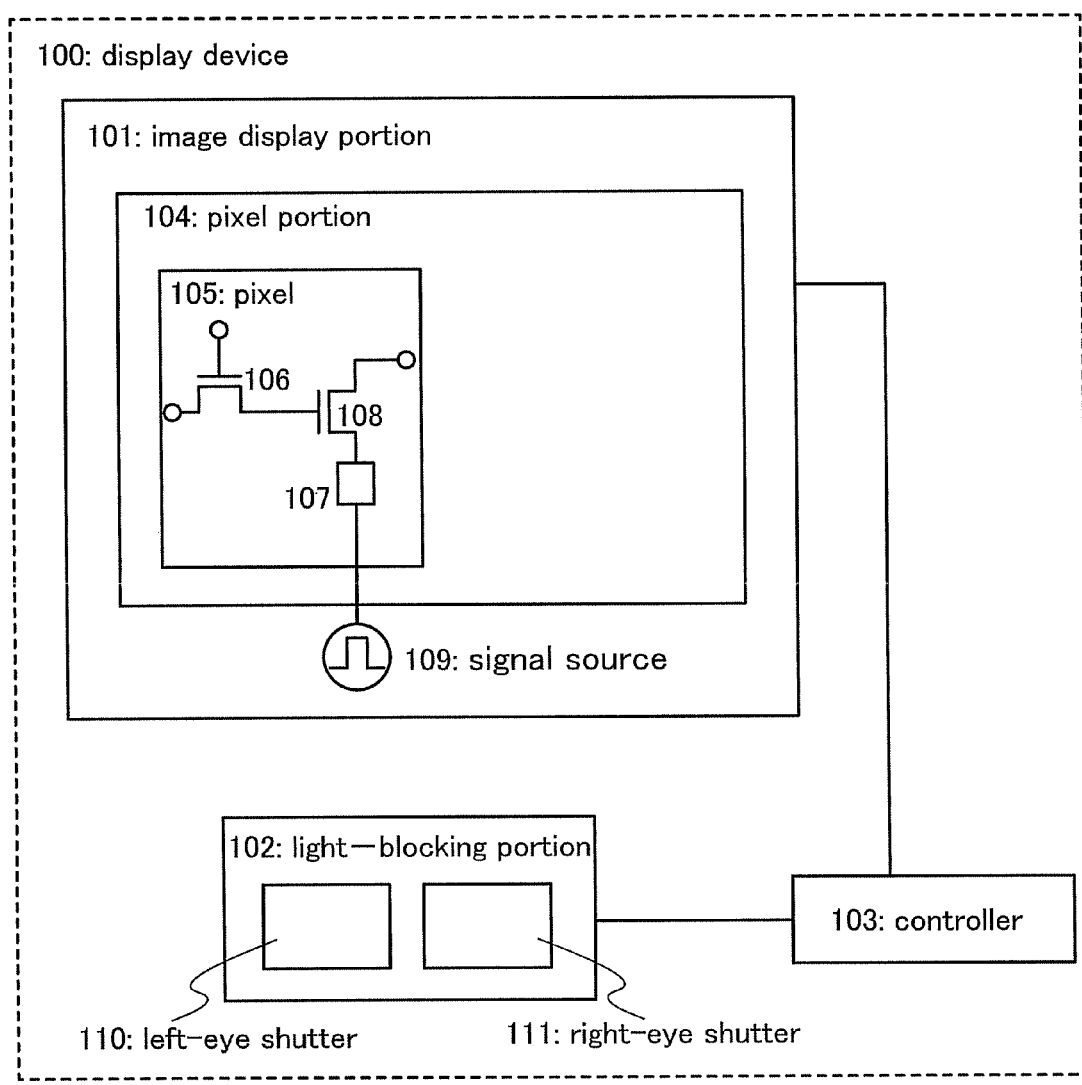
FIG. 1 is a block diagram showing a structure of a display device.

FIG. 1 is a block diagram illustrating a structural example of a display device according to one embodiment of the present invention. A display device 100 includes an image display portion 101 that displays an image, a light-blocking portion 102 that can change light transmittance and includes a plurality of shutters, and a controller 103.

The image display portion 101 has a plurality of pixels 105 in a pixel portion 104. Each of the pixels 105 includes a switching transistor 106 controlling input of an image signal to the pixel 105; a light emitting element 107 including a pixel electrode, a common electrode, and an electroluminescent layer lying between the pixel electrode and the common electrode; and a drive transistor 108 controlling the potential of the pixel electrode included in the light emitting element 107 in accordance with an image signal.

Moreover, the image display portion 101 includes a signal source 109. A pulse signal output from the signal source 109 is supplied to the pixel portion 104. The image display portion 101 includes the signal source 109 in FIG. 1; however, the signal source 109 may be provided in the display device 100, being independent of the image display portion 101.

Examples of the light emitting element 107 include an element of which luminance is controlled by current or voltage. For example, an OLED or the like can be used as the light emitting element 107. An OLED includes at least an electroluminescent layer, an anode, and a cathode. One of the anode and the cathode serves as a pixel electrode and the other serves as a common electrode. The electroluminescent layer is provided between the anode and the cathode and has a single layer or multi-layer structure. Such layers may include an inorganic compound. The luminescence in the electroluminescent layer includes light emission (fluorescence) which is obtained in returning from a singlet excited state to the ground state, and light emission (phosphorescence) which is obtained in returning from a triplet excited state to the ground state.

The potential of the pixel electrode in the light emitting element 107 is controlled by an image signal input to the pixel 105. The luminance of the light emitting element 107 depends on a potential difference between the pixel electrode and the common electrode. In each of a plurality of pixels 105 included in the pixel portion 104, the luminance of the light emitting element 107 is adjusted in accordance with the image signal, so that an image is displayed on the pixel, portion 104. By supplying an image signal with data of a left-eye image and an image signal with data of a right-eye image alternately to the pixel portion 104, a left-eye image (L image) and a right-eye image (R image) can be alternately displayed on the pixel portion 104.

FIG. 1 illustrates the case where the light-blocking portion 102 includes two shutters: a left-eye shutter 110 and a right-eye shutter 111. By changing the transmittance of the left-eye shutter 110, the amount of light entering the left eye of the viewer can be controlled. By changing the transmittance of the right-eye shutter 111, the amount of light entering the right eye of the viewer can be controlled.

The shutter can be formed using an element whose transmittance can be controlled by current or voltage, such as a liquid crystal element. The left-eye shutter 110 and the right-eye shutter 111 may each have an isolated liquid crystal panel. Alternatively, they may share one liquid crystal panel. In the latter case, the transmittances of a region serving as the left-eye shutter 110 and a region serving as the right-eye shutter 111 included in the liquid crystal panel are separately controlled.

Note that in this specification, a panel refers to a substrate over which a display element such as a liquid crystal element and a light emitting element is formed. Examples of such a panel include a module with the substrate on which an IC including a controller is contained.

The controller 103 brings the time at which an image is displayed on the pixel portion 104, the time at which the transmittance of a plurality of shutter included in the light-blocking portion 102 is changed, and the time at which the potential of a signal output from the signal source 109 is changed into synchronism with each other.

Specifically, during the display period during which an L image is displayed on the pixel portion 104, the controller 103 brings the operation of the pixel portion 104 into synchronism with the operation of the light-blocking portion 102 so as to make the transmittance of the left-eye shutter 110 high and the transmittance of the right-eye shutter 111 low, ideally 0%. In contrast, during the display period during which an R image is displayed on the pixel portion 104, the controller 103 brings the operation of the pixel portion 104 into synchronism with the operation of the light-blocking portion 102 so as to make the transmittance of the left-eye shutter 110 low, ideally 0%, and the transmittance of the right-eye shutter 111 high. Moreover, during the write period during which image signals of an L image or an R image are supplied to the pixel portion 104, the controller 103 brings the operation of the pixel portion 104 into synchronism with the operation of the light-blocking portion 102 so as to make the transmittance of the left-eye shutter 110 and right-eye shutter 111 low, ideally 0%.

Specifically, the controller 103 brings the operation of the pixel portion 104 into synchronism with the operation of the signal source 109 such that the potential of a signal output from the signal source 109 is switched between the display period and the write period. More specifically, while the drive transistor 108 is on during the display period, the signal source 109 controls the potential of the common electrode so that a forward bias voltage so high that the light emitting element 107 emits light may be applied between the pixel electrode and the common electrode. In addition, while the drive transistor 108 is on during the write period, the signal source 109 controls the potential of the common electrode so that a forward bias voltage so low that the light emitting element 107 does not emit light, zero bias voltage, or a reverse bias voltage may be applied between the pixel electrode and the common electrode.

The value of a forward bias voltage so low that the light emitting element 107 does not emit light can be determined by the threshold voltage of the light emitting element 107.

With the controller 103, as mentioned above, the operation of the pixel portion 104 is brought in synchronism with the operation of the light-blocking portion 102, so that the operation by which L image enters the left eye of the viewer and the next operation by which an R image enters to the right eye of the viewer can be alternately performed. The above-stated system allows the viewer to see a three-dimensional image consisting of an L image and an R image. In addition, with the controller 103, as mentioned above, the operation of the pixel portion 104 is brought in synchronism with the operation of the signal source 109, so that the mixed image of an L image and an R image can be prevented from being displayed on the pixel portion 104 during the write period, thereby reliably keeping such an image from going to the eyes of the viewer.

Next, connections between the switching transistor 106, the light emitting element 107, and the drive transistor 108 included in the pixel 105 will be described.

Note that in this specification, the term "connection" means electrical connection and corresponds to a state in which current, voltage, or potential can be supplied or transmitted. Therefore, a connection state does not always mean a direct connection state but includes an indirect connection state through an element such as wiring, a conductive film, a resistor, a diode, or a transistor so that current, voltage, or potential can be supplied or transmitted.

In addition, even when different components are connected to each other in a circuit diagram, there is actually the case where one conductive film has functions of a plurality of components such as the case where part of wiring serves as an electrode. The term "connection" also means such a case where one conductive film has functions of a plurality of components.

The names of the source electrode and the drain electrode included in the transistor interchange with each other depending on the conductivity type of the transistor or the levels of potentials applied to the electrodes. In general, in an n-channel transistor, an electrode to which a lower potential is applied is called a source electrode, and an electrode to which a higher potential is applied is called a drain electrode. In general, in a p-channel transistor, an electrode to which a lower potential is applied is called a drain electrode, and an electrode to which a higher potential is applied is called a source electrode. Hereinafter, one of a source electrode and a drain electrode will be referred to as a first terminal, and the other, a second terminal.

The switching transistor 106 has a first terminal to which the potential of an image signal is applied, and a second terminal connected to a gate electrode of a drive transistor 108. The drive transistor 108 has a first terminal to which power supply potential is applied, and a second terminal connected to the light emitting element 107. The light emitting element 107 includes a pixel electrode, a common electrode, and an electroluminescent layer lying between the pixel electrode and the common electrode. Specifically, the second terminal of the drive transistor 108 is connected to the pixel electrode of the light emitting element 107. The common electrode of the light emitting element 107 is supplied with common potential from the signal source 109.

During the write period, the power supply potential and the common potential are approximately the same or have a difference. Such a difference is supposed to cause either a forward bias voltage so low that the light emitting element 107 does not emit light or reverse bias voltage to be applied between the pixel electrode and the common electrode of the light emitting element 107 while the drive transistor 108 is on. During the display period, the power supply potential and the common potential have a difference. Such a difference is supposed to cause a forward bias voltage so high that the light emitting element 107 emits light to be applied between the pixel electrode and the common electrode of the light emitting element 107 while the drive transistor 108 is on.

Note that the switching transistor 106 and the drive transistor 108 each are either an n-channel transistor or a p-channel transistor.

FIG. 1 illustrates the case where the pixel 105 does not include a storage capacitor. However, a storage capacitor for retaining the potential of an image signal may be connected to the gate electrode of the drive transistor 108.

The switching transistor 106 and the drive transistor 108 each have an active layer of either a wide-gap semiconductor such as an oxide semiconductor, or a semiconductor such as amorphous, microcrystalline, polycrystalline, or single crystal silicon or germanium.

An oxide semiconductor has a wider bandgap and lower intrinsic carrier density than silicon. Therefore, a transistor using an oxide semiconductor in its active layer can have an extremely low off-state current compared with a transistor having a semiconductor such as normal silicon or germanium in its active layer.

Note that a highly-purified oxide semiconductor (a purified oxide semiconductor) obtained by reduction of impurities such as moisture or hydrogen which serve as electron donors (donors) and reduction of oxygen deficiency is an intrinsic (i-type) semiconductor or a substantially intrinsic semiconductor. Thus, a transistor including the oxide semiconductor has extremely low off-state current. Specifically, the concentration of hydrogen in the highly-purified oxide semiconductor that is measured by secondary ion mass spectrometry (SIMS) is $5\times10^{19}/cm^3$ or lower, preferably $5\times10^{18}/cm^3$ or lower, more preferably $5\times10^{17}/cm^3$ or lower, still more preferably $1\times10^{16}/cm^3$ or lower. In addition, the carrier density of the oxide semiconductor that can be measured by Hall effect measurement is lower than $1\times10^{14}/cm^3$, preferably lower than $1\times10^{12}/cm^3$, more preferably lower than $1\times10^{11}/cm^3$. Further, the band gap of the oxide semiconductor is 2 eV or more, preferably 2.5 eV or more, more preferably 3 eV or more. With the use of an oxide semiconductor film which is highly purified by a sufficient decrease in the concentration of impurities such as moisture or hydrogen and reduction of oxygen deficiency, the off-state current of the transistor can be decreased.

The analysis of the concentration of hydrogen in the oxide semiconductor film is described here. The concentration of hydrogen in the semiconductor film is measured by SIMS. It is known that it is difficult to obtain precise data in the vicinity of a surface of a sample or in the vicinity of an interface between stacked films formed using different materials by SIMS in principle. Thus, in the case where the distribution of the concentration of hydrogen in the film in a thickness direction is analyzed by SIMS, an average value in a region of the film in which the value is not greatly changed and substantially the same value can be obtained is employed as the hydrogen concentration. In addition, in the case where the thickness of the film is small, a region where substantially the same value can be obtained cannot be found in some cases due to the influence of the hydrogen concentration of the films adjacent to each other. In that case, the maximum value or the minimum value of the hydrogen concentration in the region of the film is employed as the hydrogen concentration of the film. Further, in the case where a mountain-shaped peak having the maximum value or a valley-shaped peak having the minimum value do not exist in the region of the film, the value at an inflection point is employed as the hydrogen concentration.

Specifically, various experiments can prove low off-state current of a transistor including a highly-purified oxide semiconductor film as an active layer. For example, even when an element has a channel width of $1\times10^6$ μm and a channel length of 10 μm, off-state current can be lower than or equal to the measurement limit of a semiconductor parameter analyzer, i.e., lower than or equal to $1\times10^{-13}$ A, at a voltage (drain voltage) between a source electrode and a drain electrode of 1 to 10 V. In that case, it can be seen that off-state current density corresponding to a value obtained by division of the off-state current by the channel width of the transistor is lower than or equal to 100 zA/μm. In addition, a capacitor and a transistor were connected to each other and off-state current density was measured using a circuit in which electrical charge flowing to or from the capacitor was controlled by the transistor. In the measurement, a highly-purified oxide semiconductor film is used for a channel-formation region in the transistor, and the off-state current density of the transistor was measured from a change in the amount of electrical charge of the capacitor per unit hour. As a result, it can be seen that, in the case where the voltage between the source electrode and the drain electrode of the transistor was 3 V, a lower off-state current density of several tens yoctoampere per micrometer (yA/μm) is obtained. Thus, the off-state current density of the transistor including the highly-purified oxide semiconductor film as an active layer can be 100 yA/μm or lower, preferably 10 yA/μm or lower, more preferably 1 yA/μm or lower depending on the voltage between the source electrode and the drain electrode. Consequently, the transistor including the highly-purified oxide semiconductor film as an active layer has much lower off-state current than a transistor including crystalline silicon.

As the oxide semiconductor, for example, indium oxide; tin oxide; zinc oxide; a binary metal oxide such as an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide; a ternary metal oxide such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide; or a quaternary metal oxide such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide can be used. The oxide semiconductor may include silicon.

Note that, for example, an In—Ga—Zn-based oxide means an oxide containing In, Ga, and Zn, and there is no limitation on the ratio of In, Ga, and Zn. In addition, the In—Ga—Zn-based oxide may contain a metal element other than In, Ga, and Zn. The In—Ga—Zn-based oxide has sufficiently high resistance when there is no electric field and off-state current can be sufficiently reduced. Further, with high field-effect mobility, the In—Ga—Zn-based oxide is suitable for a semiconductor material used in a display device.

Alternatively, a material represented by a chemical formula, $InMO_3(ZnO)_m$ (m>0) may be used as an oxide semiconductor. Here, M represents one or more metal elements selected from Ga, Al, Mn, or Co. For example, M can be Ga, Ga and Al, Ga and Fe, Ga and Ni, Ga and Mn, Ga and Co, or the like. As the oxide semiconductor, a material represented by $In_3SnO_5(ZnO)_n$ (n>0, where n is an integer) may be used. Note that the above compositions are derived from the crystal structures and are only examples.

Note that unless otherwise specified, in this specification, in the case of an n-channel transistor, off-state current is current which flows between a source electrode and a drain electrode when a potential of the drain electrode is higher than that of the source electrode or that of a gate electrode while the potential of the gate electrode is 0 V or lower when a reference potential is the potential of the source electrode. Alternatively, in this specification, in the case of a p-channel transistor, off-state current is current which flows between a source electrode and a drain electrode when a potential of the drain electrode is lower than that of the source electrode or that of a gate electrode while the potential of the gate electrode is 0 V or higher when a reference potential is the potential of the source electrode.

The use of an oxide semiconductor for the active layer in the switching transistor 106 can reduce the off-state current of the transistor. A reduction in the off-state current of the switching transistor 106 leads to a reduction in the amount of charge leaking from the gate electrode of the drive transistor 108. Consequently, the retention of the potential of an image signal is achieved even when the storage capacitor for retaining the potential of an image signal is downsized or eliminated. Therefore, in the case where light is extracted from the pixel electrode of the light emitting element 107 side, the aperture ratio can be increased and light extraction efficiency can be enhanced.

As an example of a semiconductor material whose band gap is wider than that of silicon and whose intrinsic carrier density is lower than that of silicon, a compound semiconductor such as silicon carbide (SiC) or gallium nitride (GaN) as well as an oxide semiconductor can be used. The oxide semiconductor has an advantage of high mass productivity because the oxide semiconductor can be formed by sputtering or a wet process, unlike a compound semiconductor such as silicon carbide or gallium nitride. Further, unlike silicon carbide or gallium nitride, the oxide semiconductor can be deposited even at room temperature; thus, deposition over a glass substrate or deposition over an integrated circuit using silicon is possible. Thus, with the oxide semiconductor, mass productivity is higher than that in the case of silicon carbide, gallium nitride, or the like. In the case where a crystalline oxide semiconductor is to be obtained in order to improve the performance of a transistor (e.g., field-effect mobility), the crystalline oxide semiconductor can be easily obtained by heat treatment at 250 to 800° C.

An oxide semiconductor has a higher mobility than amorphous silicon, and thus is applicable to sixth (or more) generation large-sized substrates, unlike polycrystalline silicon or microcrystalline silicon.

Note that the switching transistor 106 operates in the linear region and thus serves as a switching element. Therefore, the switching transistor 106 is not necessarily used in the singular: the pixel 105 may use a plurality of switching transistors 106 connected to each other in either parallel or serial.

Note that in this specification, a state in which transistors are connected in series means, for example, a state in which only one of a first terminal and a second terminal of a first transistor is connected to only one of a first terminal and a second terminal of a second transistor. Further, a state in which transistors are connected in parallel means a state in which a first terminal of a first transistor is connected to a first terminal of a second transistor and a second terminal of the first transistor is connected to a second terminal of the second transistor.

The switching transistor 106 and the drive transistor 108 each include at least a gate electrode present on one side of the active layer. Alternatively, they may each include a pair of gate electrodes with the active layer interposed therebetween. In addition, the switching transistor 106 and the drive transistor 108 each are either a signal gate transistor which includes a single gate electrode and a single channel formation region, or a multi-gate transistor which includes a plurality of gate electrodes electrically connected to each other and thus includes a plurality of channel formation regions.

Next, the operation of the pixel 105 will be described with reference to FIGS. 2A and 2B. The circuit diagrams of FIGS. 2A and 2B show the switching transistor 106 serving as a switching element, in the foul) of a switch.

Figure 2A:
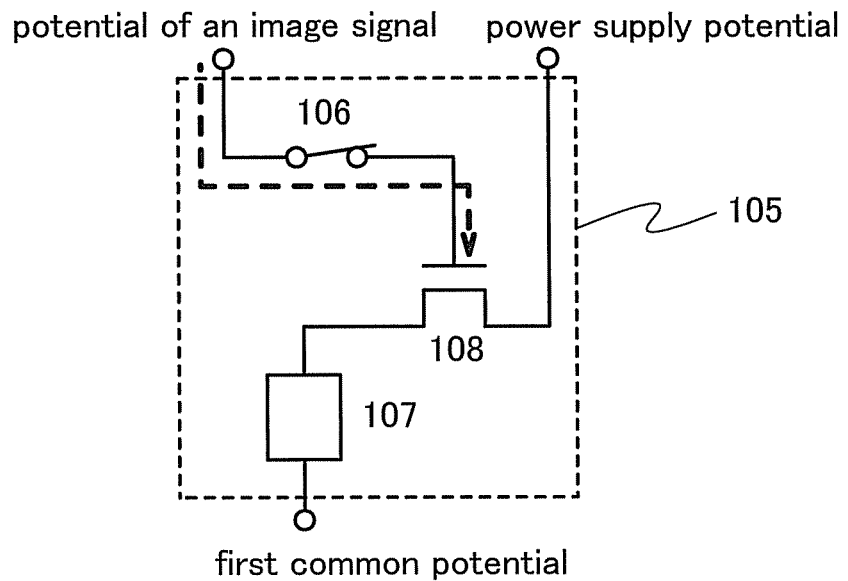
FIGS. 2A and 2B are circuit diagrams of pixels.
Figure 2B:
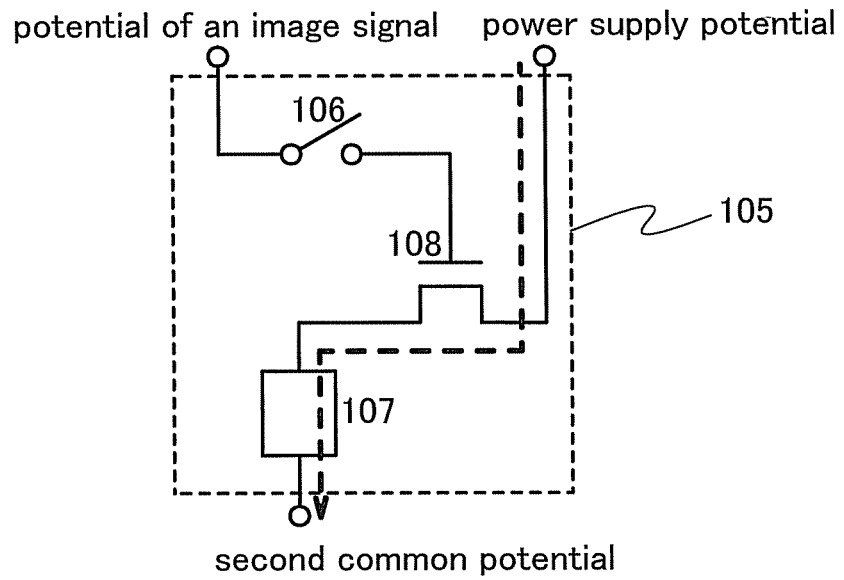

FIG. 2A schematically shows the operation of the pixel 105 performed when an image signal is supplied. During the supply of an image signal, in the pixel 105, the switching transistor 106 is on. Consequently, as shown by the dotted arrow, the potential of an image signal is applied to the gate electrode of the drive transistor 108 via the switching transistor 106. Resistance between the source electrode and drain electrode of the drive transistor 108 depends on difference between the potential of the source electrode and the potential of the gate electrode (gate voltage) which is determined using the potential of the source electrode as a reference potential.

During the supply of an image signal, approximately the same potential as the power supply potential or common potential at a level different from that of the power supply potential is supplied to the common electrode of the light emitting element 107 from the signal source 109. Specifically, when the above-stated common potential is referred to as a first common potential, a difference between the power supply potential and the first common potential is supposed to cause either a forward bias voltage so low that the light emitting element 107 does not emit light or reverse bias voltage to be applied between the pixel electrode and the common electrode of the light emitting element 107 while the drive transistor 108 is on. Therefore, for example, in the case where the pixel electrode is an anode and the common electrode is a cathode, the first common potential is either slightly lower than the power supply potential, the same as the power supply potential, or higher than the power supply potential. In contrast, for example, in the case where the pixel electrode is a cathode and the common electrode is an anode, the first common potential is either slightly higher than the power supply potential, the same as the power supply potential, or lower than the power supply potential.

Consequently, the light emitting element 107 is off during the supply of an image signal, regardless of the potential of an image signal. When the supply of an image signal is finished, the switching transistor 106 is turned off.

Next, image display is performed in accordance with the supplied image signal. FIG. 2B schematically shows the operation of the pixel 105 during the display period. During when an image is displayed, in the pixel 105, the switching transistor 106 is off. Since the switching transistor 106 is off, the potential of the image signal that has been supplied to the gate electrode of the drive transistor 108 is retained.

During when an image is displayed, common potential at a level different from that of the power supply potential is supplied to the common electrode of the light emitting element 107 from the signal source 109. Specifically, when the above-stated common potential is referred to as a second common potential, a difference between the power supply potential and the second common potential is supposed to cause either a forward bias voltage so high that the light emitting element 107 emits light to be applied between the pixel electrode and the common electrode of the light emitting element 107 while the drive transistor 108 is on. Therefore, for example, in the case where the pixel electrode is an anode and the common electrode is a cathode, the second common potential is lower than the power supply potential. In contrast, for example, in the case where the pixel electrode is a cathode and the common electrode is an anode, the second common potential is higher than the power supply potential.

Consequently, as shown by the dotted arrow, current is supplied to the light emitting element 107. The value of the current supplied to the light emitting element 107 is determined by the resistance between the source electrode and drain electrode of the drive transistor 108. The luminance of the light emitting element 107 is determined by the value of the above-stated current. This means that the luminance of the light emitting element 107 is determined by the potential of an image signal.

Such a supply operation is performed on the pixels row by row. A row of pixels refers to a group of pixels having the switching transistors 106 whose gate electrodes are connected to each other. A period needed to supply image signals row by row to all the pixels 105 within the pixel portion 104 corresponds to a write period. Display operation is performed concurrently on all the pixels.

Next, the method for bringing the operation of the pixel portion 104 included in the image display portion 101 and the operation of the left-eye shutter 110 and right-eye shutter 111 included in the light-blocking portion 102 into synchronism with each other in the display device according to one embodiment of the present invention will be described.

FIG. 3 is a timing diagram illustrating the operation of the light emitting elements 107 in the pixel portion 104, common potential, and the operation of the left-eye shutter 110 and right-eye shutter 111. Note that FIG. 3 shows common potential in the case where the pixel electrode is an anode and the common electrode is a cathode.

When the period for supplying image signals of an R image (R write period) starts, supply of image signals to the pixels 105 is performed row by row in the pixel portion 104. During the R write period, the common potential is the first common potential, i.e., a high-level potential, so that the light emitting elements 107 in all the pixels 105 are turned off.

Further, during the R write period, the transmittances of the left-eye shutter 110 and the right-eye shutter 111 decrease, bringing the left-eye shutter 110 and the right-eye shutter 111 into a light-blocking state.

Then, the period for displaying an R image (R display period) is started. During the R display period, the common potential is the second common potential, i.e., a low-level potential. Consequently, the light emitting elements 107 are turned on in accordance with the image signals of an R image that have been supplied to the pixels 105. Thus, the R image display (R display) is performed.

During the R display period, the transmittance of the right-eye shutter 111 is made high, bringing the right-eye shutter 111 into a light-transmitting state. On the other hand, the transmittance of the left-eye shutter 110 remains low, so that the left-eye shutter 110 is in a light-blocking state. Consequently, light from the pixel portion 104 passes the right-eye shutter 111, so that an R image displayed on the pixel portion 104 is selectively sent to the right eye of the viewer.

Figure 6A:
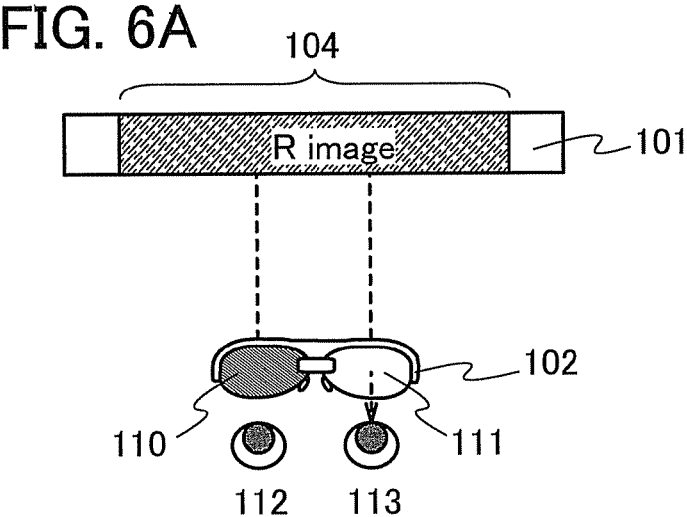
FIGS. 6A to 6C each show positional relation between a pixel portion, a light-blocking portion, and the left eye and right eye of the viewer.

FIG. 6A shows positional relation between the pixel portion 104 in the image display portion 101, the light-blocking portion 102, and the left eye 112 and right eye 113 of the viewer. The left-eye shutter 110 is present in the path of light coming from the pixel portion 104 and to the left eye 112 of the viewer. The right-eye shutter 111 is present in the path of light coming from the pixel portion 104 and going to the right eye 113 of the viewer.

FIG. 6A shows the state of the display device during the R display period. In FIG. 6A, the right-eye shutter 111 is in a light-transmitting state, while the left-eye shutter 110 is in a light-blocking state. Therefore, as shown by the dotted lines, light from the pixel portion 104 does not pass the left-eye shutter 110 but it passes the right-eye shutter 111 and enters the right eye 113. Consequently, the viewer sees the R image displayed on the pixel portion 104 with the right eye 113.

When the period for supplying image signals of an L image (L write period) starts, supply of image signals to the pixels 105 is performed row by row in the pixel portion 104. During the L write period, the common potential is the first common potential, i.e., a high-level potential, so that the light emitting elements 107 in all the pixels 105 are turned off.

Further, during the L write period, the transmittances of the left-eye shutter 110 and the right-eye shutter 111 decrease, bringing the left-eye shutter 110 and the right-eye shutter 111 into a light-blocking state.

Figure 6B:
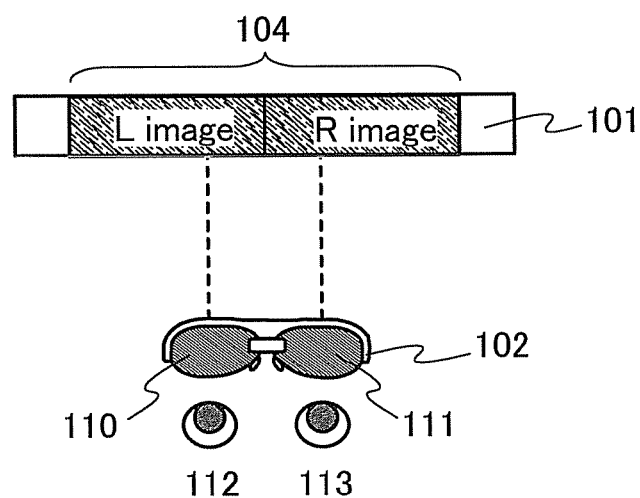

FIG. 6B shows the state of the display device during the L write period. In FIG. 6B, the left-eye shutter 110 and the right-eye shutter 111 are in a light blocking state. Consequently, the path of light coming from the pixel portion 104 and going to the left eye 112 and right eye 113 of the viewer is blocked by the left-eye shutter 110 and the right-eye shutter 111. Further, during the L write period, all the light emitting elements in the pixel portion 104 are off. Thus, even if the transmittances of the left-eye shutter 110 and the right-eye shutter 111 are not completely 0%, the mixed image of an L image and an R image does not enter the left eye 112 and right eye 113 of the viewer.

Then, the period for displaying an L image (L display period) is started. During the L display period, the common potential is the second common potential, i.e., a low-level potential. Consequently, the light emitting elements 107 are turned on in accordance with the image signals of an L image that have been supplied to the pixels 105. Thus, L image display (L display) is performed.

During the L display period, the transmittance of the left-eye shutter 110 is made high, bringing the left-eye shutter 110 into a light-transmitting state. On the other hand, the transmittance of the right-eye shutter 111 remains low, so that the right-eye shutter 111 is in a light-blocking state. Consequently, light from the pixel portion 104 passes the left-eye shutter 110, so that an L image displayed on the pixel portion 104 is selectively sent to the left eye of the viewer.

Figure 6C:
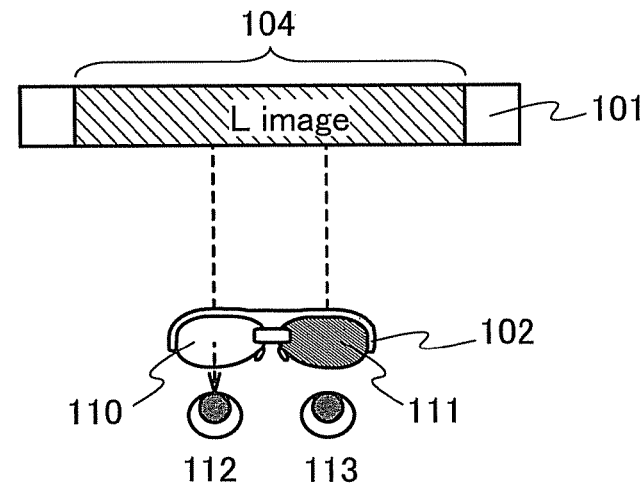

FIG. 6C shows the state of the display device during the L display period. In FIG. 6C, the left-eye shutter 110 is in a light-transmitting state and the right-eye shutter 111 is in a light-blocking state. Therefore, as shown by the dotted lines, light from the pixel portion 104 does not pass the right-eye shutter 111 but it passes the left-eye shutter 110 and enters the left eye 112. Consequently, the viewer sees the L image displayed on the pixel portion 104 with the left eye 112.

Note that the luminance of the light emitting element during the display period is controlled by the potential of an image signal. For this reason, although FIG. 3 illustrates the case where the light emitting elements are on during the R display period and the L display period, some of the light emitting elements or all the light emitting elements may be off during the R display period and the L display period depending on image signals.

The above-stated system allows the viewer to see a three-dimensional image consisting of an L image and an R image.

Note that the period for displaying an L image and an R image, i.e., the period consisting of the R write period, the R display period, the L write period, and the L display period corresponds to one frame period. For this reason, for example, when the pixel portion is driven at a frame frequency of 60 Hz, one frame period is approximately 16.6 ms. In addition, when the period consisting of the R write period and the R display period, or the period consisting of the L write period and the L display period corresponds to a sub-frame period, the sub-frame period is approximately 8.3 ms.

Next, comparison between a liquid crystal display device and the display device according to one embodiment of the present invention will be made referring to an example of the operation of the liquid crystal display device. FIG. 4 is a timing diagram illustrating the operation of liquid crystal elements in a pixel portion of the liquid crystal display device, the operation of a back-light, and the operation of a left-eye shutter and a right-eye shutter.

In the liquid crystal display device, when the period for supplying image signals of an R image (R write period) starts first, supply of image signals to the pixels is performed row by row in the pixel portion. Then, the transmittances of the liquid crystal elements are controlled in accordance with the image signals of the R image that have been supplied to the pixels. However, during the R write period, the backlight is off, so that the R image is not displayed.

Further, during the R write period, the transmittances of the left-eye shutter and the right-eye shutter decrease, bringing the left-eye shutter and the right-eye shutter into a light-blocking state.

Then, the period for displaying an R image (R display period) is started. During the R display period, the backlight is on. The transmittances of the liquid crystal elements are controlled in accordance with image signals of the R image. Since the backlight is on, the R image is displayed on the pixel portion.

During the R display period, the transmittance of the right-eye shutter is made high, bringing the right-eye shutter into a light-transmitting state. On the other hand, the transmittance of the left-eye shutter remains low, so that the left-eye shutter is in a light-blocking state. Consequently, light from the pixel portion passes the right-eye shutter, so that an R image displayed on the pixel portion is selectively sent to the right eye of the viewer.

When the period for supplying image signals of an L image (L write period) subsequently starts, supply of image signals to the pixels is performed row by row in the pixel portion. Then, the transmittances of the liquid crystal elements are controlled in accordance with the image signals of the L image pixel that have been supplied to the pixels. However, during the L write period, the backlight is off, so that the L image is not displayed.

Further, during the L write period, the transmittances of the left-eye shutter and the right-eye shutter decrease, bringing the left-eye shutter and the right-eye shutter into a light-blocking state.

Then, the period for displaying an L image (L display period) is started. During the L display period, the backlight is on. The transmittances of the liquid crystal elements are controlled in accordance with image signals of the L image. Since the backlight is on, the L image is displayed on the pixel portion.

During the L display period, the transmittance of the left-eye shutter is made high, bringing the left-eye shutter into a light-transmitting state. On the other hand, the transmittance of the right-eye shutter remains low, so that the right-eye shutter is in a light-blocking state. Consequently, light from the pixel portion passes the left-eye shutter, so that an L image displayed on the pixel portion is selectively sent to the left eye of the viewer.

The above-stated system allows the viewer to see a three-dimensional image consisting of an L image and an R image.

In the case of the above-stated liquid crystal display device also, the period for displaying an L image and an R image, i.e., the period consisting of the R write period, the R display period, the L write period, and the L display period corresponds to one frame period. For this reason, for example, when the pixel portion is driven at a frame frequency of 60 Hz, one frame period is approximately 16.6 ms. In addition, when the period consisting of the R write period and the R display period, or the period consisting of the L write period and the L display period corresponds to a sub-frame period, the sub-frame period is approximately 8.3 ms.

In the case of the liquid crystal display device, since a liquid crystal element included in the pixel has lower response speed than a light emitting element, it is necessary to ensure the R write period and the L write period which are longer than those for the display device shown in FIG. 3. Consequently, the display device according to one embodiment of the present invention employs longer R display periods and longer L display periods than the liquid crystal display device, on the assumption that the sub-frame periods these devices use have the same length, and thus produces a higher duty cycle. Therefore, it can be said that the display device according to one embodiment of the present invention can display a bright image with low power consumption.

Next, comparison between the display device according to one embodiment of the present invention and a display device used for comparison will be made referring to an example of the operation of the display device used for comparison. The display device used for comparison is similar to the display device according to one embodiment of the present invention in that it uses a light emitting element in a pixel but is different from the display device according to one embodiment of the present invention in that it uses a common electrode whose potential is fixed.

Figure 5:
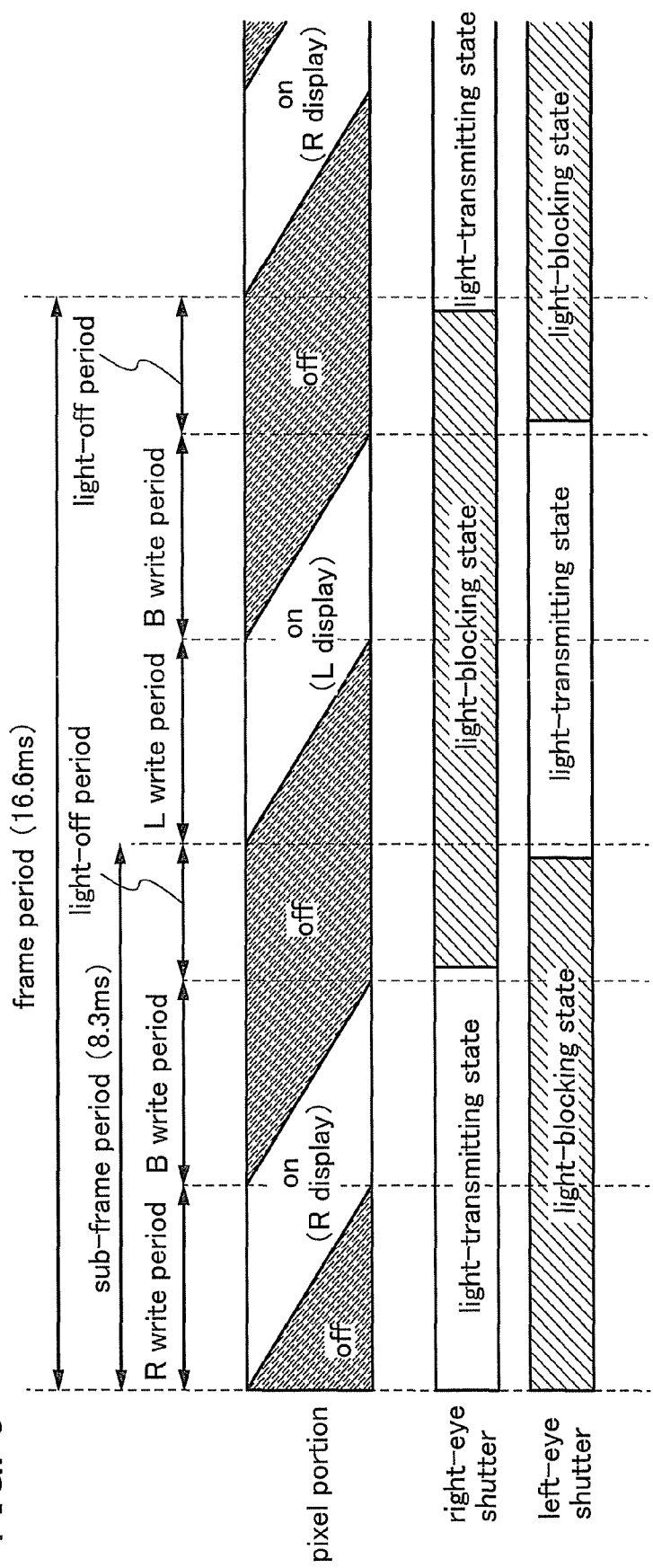
FIG. 5 is a timing diagram of operation of a display device for comparison.

FIG. 5 is a timing diagram illustrating the operation of light-emitting elements in a pixel portion of the display device used for comparison and the operation of a left-eye shutter and a right-eye shutter.

In the case of the display device used for comparison, when the period for supplying image signals of an R image (R write period) starts, supply of image signals to the pixels is performed row by row in the pixel portion. Then, the light emitting elements are turned on in accordance with the image signals of an R image that have been supplied to the pixels. Thus, the R image display (R display) is performed in the pixel portion. In other words, image display is performed simultaneously with the supply of image signals to the pixels. Thus, it can be said that the R write period is included in the R display period. FIG. 5 illustrates the case where the R write period has the same length as the R display period.

Subsequently, in the case of the display device used for comparison, a period for supplying image signals by which the light emitting elements are turned off, which are used to display a black image, (B write period) is started. When the B write period is started, supply of image signals used to display a black image to the pixels is performed row by row in the pixel portion. Then, the light emitting elements are turned off in accordance with the image signals of the black image that have been supplied to the pixels.

During the R write period and the B write period, the transmittance of the right-eye shutter is made high, bringing the right-eye shutter into a light-transmitting state. On the other hand, the transmittance of the left-eye shutter decreases, so that the left-eye shutter is brought into a light-blocking state. Consequently, light from the pixel portion passes the right-eye shutter, so that an R image displayed on the pixel portion is selectively sent to the right eye of the viewer.

An light-off period during which the light emitting elements in all the pixels within the pixel portion are turned off is placed after the B write period to prevent the mixed image of an R image and an L image from being displayed on the pixel portion. During the light-off period, the transmittances of the left-eye shutter and the right-eye shutter decrease, bringing the left-eye shutter and the right-eye shutter into a light-blocking state.

When the period for supplying image signals of an L image (L write period) subsequently starts, supply of image signals to the pixels is performed row by row in the pixel portion. Then, the light emitting elements are turned on in accordance with the image signals of an L image that have been supplied to the pixels. Thus, the L image display (L display) is performed in the pixel portion. In other words, image display is performed simultaneously with the supply of image signals to the pixels. Thus, it can be said that the L write period is included in the L display period. FIG. 5 illustrates the case where the L write period overlaps with the L display period.

Next, the B write period is started again. When the B write period is started, supply of image signals used to display a black image to the pixels is performed row by row in the pixel portion. Then, the light emitting elements are turned off in accordance with the image signals of the black image that have been supplied to the pixels.

During the L write period and the B write period, the transmittance of the left-eye shutter is made high, bringing the left-eye shutter into a light-transmitting state. On the other hand, the transmittance of the right-eye shutter decreases, so that the right-eye shutter is in a light-blocking state. Consequently, light from the pixel portion passes the left-eye shutter, so that an L image displayed on the pixel portion is selectively sent to the left eye of the viewer.

An light-off period during which the light emitting elements in all the pixels within the pixel portion are turned off is placed after the B write period to prevent the mixed image of an R image and an L image from being displayed on the pixel portion. During the light-off period, the transmittances of the left-eye shutter and the right-eye shutter decrease, bringing the left-eye shutter and the right-eye shutter into a light-blocking state.

Note that, as mentioned above, the luminance of the light emitting element during the display period is controlled by the potential of an image signal. For this reason, although FIG. 5 illustrates the case where the light emitting elements are on during the R display period and the L display period, i.e., the R write period and the L write period, some of the light emitting elements or all the light emitting elements may be off during the R display period and the L display period depending on image signals.

The above-stated system allows the viewer to see a three-dimensional image consisting of an L image and an R image.

In the case of the display device used for comparison, the period for displaying an L image and an R image, i.e., the period consisting of the R write period, the B write period, the light-off period, the L write period, the B write period, and the light-off period corresponds to one frame period. For this reason, for example, when the pixel portion is driven at a frame frequency of 60 Hz, one frame period is approximately 16.6 ms. In addition, when the period consisting of the R write period and the R display period, or the period consisting of the L write period and the L display period corresponds to a sub-frame period, the sub-frame period is approximately 8.3 ms.

Further, in the case of the display device used for comparison, as in the case of the display device according to one embodiment of the present invention, a light emitting element is used as a display element, so that the R write period and the L write period require approximately the same length of time. However, in the case of the display device used for comparison, it is necessary to switch the transmittance between the left-eye shutter and the right-eye shutter during the light-off period lying between the B write period and the subsequent L write period. The shutter uses an element whose transmittance can be controlled by supply of current or voltage, such as a liquid crystal element; thus, it takes time to switch the transmittance between the shutters. Therefore, focusing on a given pixel in the case of the display device used for comparison, the light emitting element is off during both the light-off period needed for switching the shutter transmittance and the period for supplying image signals used to display a black image. This reduces the ratio of the period during which the light emitting elements are on in one frame period, i.e. the duty cycle that is the ratio of a display period in one frame period, which makes it difficult to achieve an object of one embodiment of the present invention, i.e. a display device capable of displaying bright images with low power consumption.

On the other hand, in the case of the display device according to one embodiment of the present invention, the signal source 109 controls the level of the common potential, so that supply of image signals used to display a black image is not needed for the light emitting elements 107 to be turned off. In other words, the light emitting elements in all the pixels can be turned off concurrently by a different type of signal from the image signal. Thus, all the light emitting elements 107 can be turned off concurrently during the R write period and the L write period. Further, during the above-stated write period, the pixels 105 that have already been subjected to the supply of image signals and the other pixels 105 exist in the pixel portion 104 at the same time. In other words, if the common potential is fixed, the mixed image of an L image and an R image is displayed on the pixel portion 104. However, in one embodiment of the present invention, by turning off the light emitting elements 107 during the above-stated write period, the mixed image of an L image and an R image is prevented from being displayed on the pixel portion 104.

In addition, in one embodiment of the present invention, the transmittance can be switched between the left-eye shutter and the right-eye shutter during the above-stated write period. Consequently, the duty cycle that is the ratio of a display period in one frame period can be made higher than that in the display device used for comparison, without cross talk. Thus, a display device capable of displaying bright images with low power consumption can be achieved.

In one embodiment of the present invention, since the mixed image of an L image and an R image is not displayed on the pixel portion 104 during the write period, cross talk in which a left-eye image enters the right eye or a right-eye image enters the left eye occurs can be prevented.

Further, during the write period, turning off the light emitting elements 107 leads to a reduction in the power consumption of the image display portion 101 and a reduction in the power consumption of the display device 100 as a whole.

Embodiment 2

Figure 7:
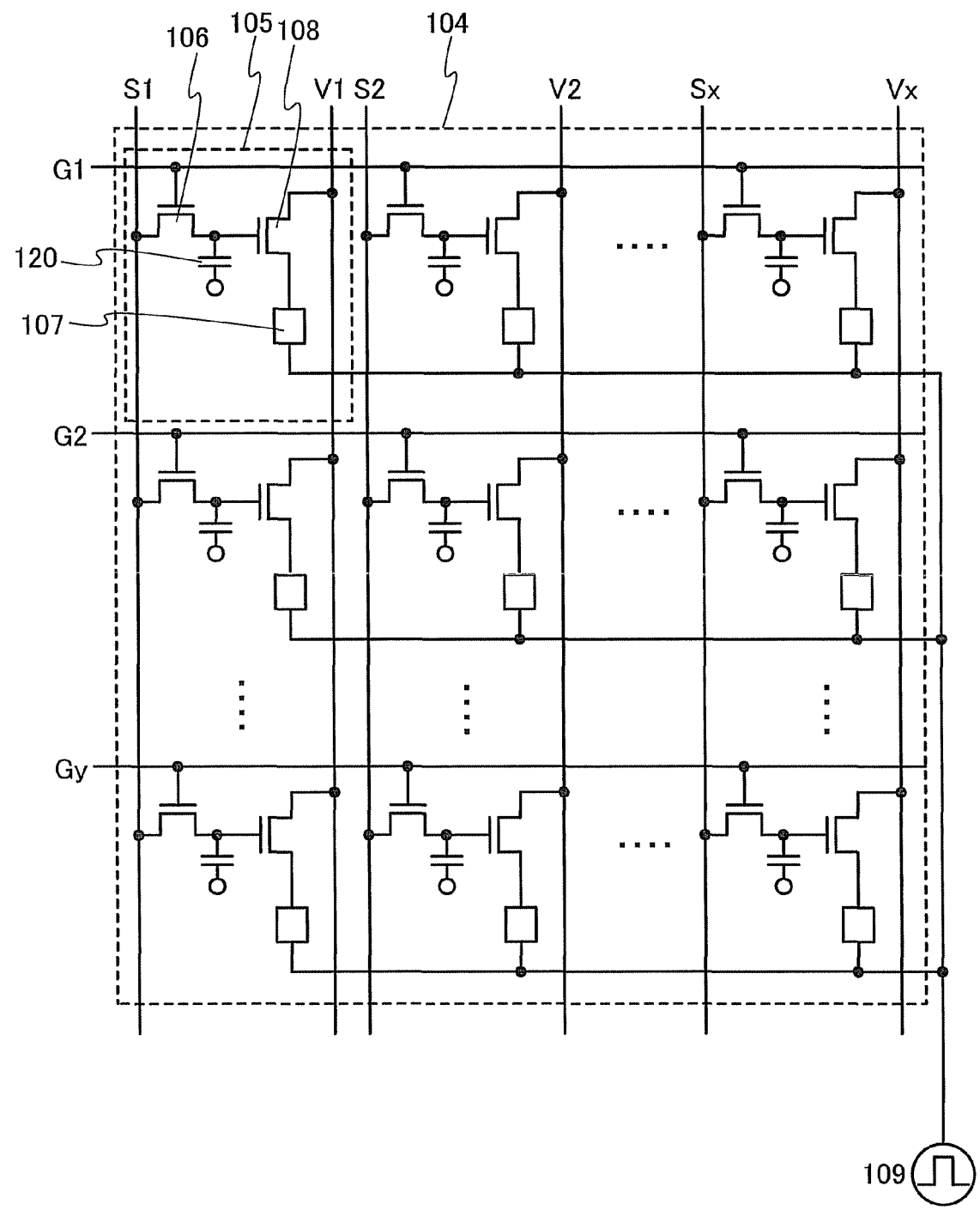
FIG. 7 is an example of a specific circuit diagram of the pixel portion.

FIG. 7 is an example of a specific circuit diagram of the pixel portion 104 including a plurality of pixels 105 shown in FIG. 1.

As shown in FIG. 7, the pixel portion 104 includes signal lines S1 to Sx, scan lines G1 to Gy, and power supply lines V1 to Vx. The pixel 105 includes any one of the signal lines S1 to Sx, any one of the scan lines G1 to Gy, and any one of the power supply lines V1 to Vx.

In each of the pixels 105, the switching transistor 106 has a gate electrode connected to the scan line Gj (j is between 1 and y). The switching transistor 106 has a first terminal connected to the signal line Si (i is between 1 and x) supplied with an image signal, and a second terminal connected to the gate electrode of the drive transistor 108. The drive transistor 108 has a first terminal connected to the power supply line Vi supplied with power supply potential, and a second terminal connected to the pixel electrode of the light emitting element 107. The common electrode of the light emitting element 107 is supplied with common potential from the signal source 109.

FIG. 7 illustrates the case where the pixel 105 includes a storage capacitor 120. The storage capacitor 120 is connected to the gate electrode of the drive transistor 108. The storage capacitor 120 retains the potential of the gate electrode of the drive transistor 108. Specifically, one of the pair of electrodes included in the storage capacitor 120 is connected to the gate electrode of the drive transistor 108, and the other is connected to a node supplied with a fixed potential, e.g., the power supply line Vi.

FIG. 7 illustrates the case where the switching transistor 106 and the drive transistor 108 are n-channel transistors; however, each of these transistors may be either an n-channel transistor or a p-channel transistor.

Next, a method for driving the pixel portion 104 shown in FIG. 7 will be described.

First, during the write period, the scan lines G1 to Gy are sequentially selected. When the scan line Gj, for example, is selected, the switching transistors 106 whose gate electrodes are connected to the scan line Gj is turned on. Since these switching transistors 106 are turned on, the potentials of image signals that have been input to the signal lines S1 to Sx are supplied to the gate electrodes of the corresponding drive transistors 108. After the selection of the scan line Gj is finished, the corresponding switching transistors 106 are turned off, so that the potentials of the image signals are held at the gate electrodes of these drive transistors 108.

Note that during the write period, the first common potential is supplied to the common electrodes of the light emitting elements 107 from the signal source 109. The light emitting elements 107 are therefore off regardless of the levels of the potentials of the image signals.

Subsequently, the write period is finished and the display period is started, so that the common electrodes of the light emitting elements 107 are supplied with the second common potential from the signal source 109. Then, if the drive transistors 108 are on in accordance with the potentials of the image signals, these light emitting elements 107 are supplied with current and then turned on. The value of a current flowing through the light emitting element 107 is determined mainly by the drain current of the drive transistor 108. Thus, the luminance of the light emitting element 107 is determined by the potential of the image signal. In contrast, if the drive transistors 108 are off in accordance with the potentials of the image signals, supply of current to these light emitting elements 107 is not performed, so that these light emitting elements 107 are turned off.

An image can be displayed by the above-stated operation.

This embodiment can be implemented in combination with the above embodiment.

Embodiment 3

Figure 8:
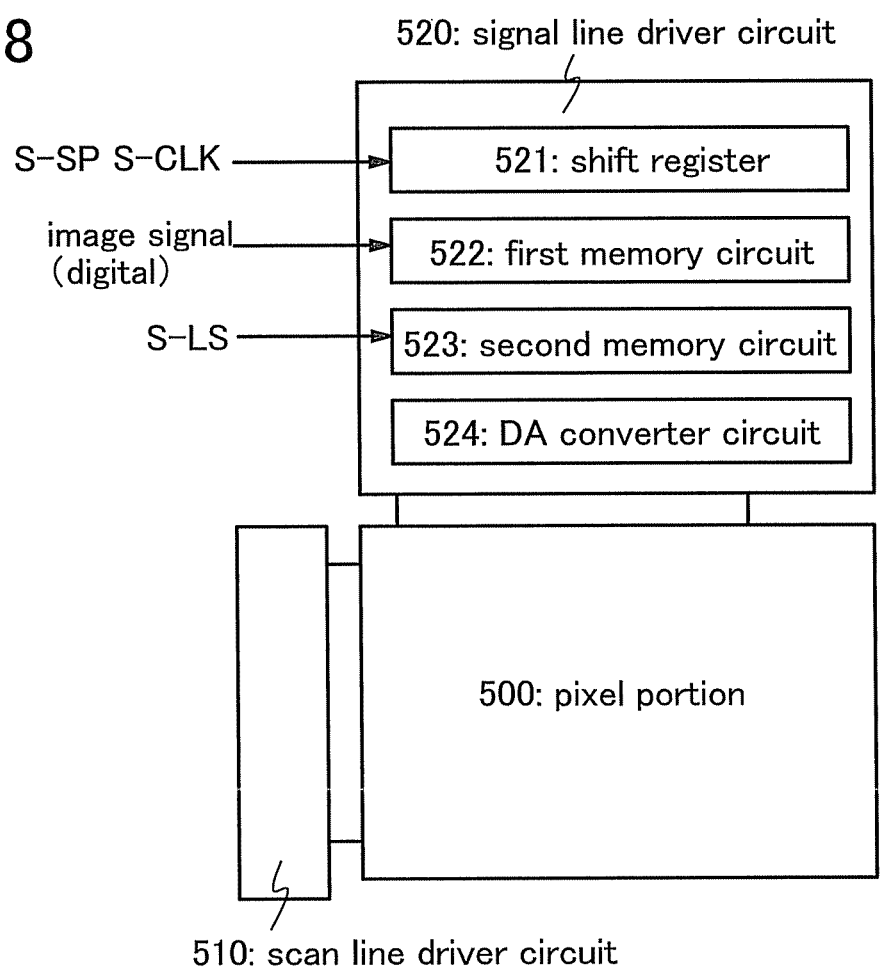
FIG. 8 is a block diagram of an image display portion.

In this embodiment, an example of a specific configuration of an image display portion included in a display device according to one embodiment of the present invention is described. FIG. 8 is a block diagram of the image display portion in this embodiment as an example. Note that in the block diagram of FIG. 8, circuits in the image display portion are classified by their functions and independent blocks are illustrated. However, it is difficult to classify actual circuits by their functions completely and, in some cases, one circuit has a plurality of functions.

The image display portion shown in FIG. 8 includes a pixel portion 500 having a plurality of pixels, a scan line driver circuit 510 for selecting pixels row by row, and a signal line driver circuit 520 for controlling the input of image signals to pixels in a selected line.

The signal line driver circuit 520 includes a shift register 521, a first memory circuit 522, a second memory circuit 523, and a DA converter circuit 524. A clock signal S-CLK and a start pulse signal S-SP are input to the shift register 521. The shift register 521 generates timing signals, pulses of which are sequentially shifted, in response to the clock signal S-CLK and the start pulse signal S-SP, and outputs the timing signals to the first memory circuit 522. The order of the appearance of the pulses of the timing signal may be switched in response to scan direction switching signals.

When a timing signal is input to the first memory circuit 522, image signals are sequentially applied to and held in the first memory circuit 522 in response to the pulse of the timing signal. The image signals may be sequentially supplied to a plurality of memory circuits included in the first memory circuit 522. Alternatively, so-called division driving may be performed, in which a plurality of memory circuits included in the first memory circuit 522 are divided into several groups and image signals are input to each group in parallel.

The time until the completion of application of image signals to all of the memory circuits in the first memory circuit 522 is referred to as a line period. In practice, a period when a horizontal retrace interval is added to the line period refers to a line period in some cases.

When one line period is finished, the image signals held in the first memory circuit 522 are applied to the second memory circuit 523 all at once and held in response to the pulse of a latch signal S-LS which is input to the second memory circuit 523. Image signals in the next line period are sequentially applied to the first memory circuit 522 which has finished sending the image signals to the second memory circuit 523, in response to timing signals from the shift register 521 again. During this second round of one line period, the image signals that are applied to and held in the second memory circuit 523 are input to the DA converter circuit 524.

The DA converter circuit 524 converts an input digital image signal into an analog image signal and inputs the analog image signal to each pixel included in the pixel portion 500 through the signal line.

Note that the signal line driver circuit 520 may use another circuit which can output a signal the pulse of which sequentially shifts instead of the shift register 521.

Note that, although the pixel portion 500 is directly connected to the subsequent stage to the DA converter circuit 524 in FIG. 8, one embodiment of the present invention is not limited to this configuration. A circuit performing signal processing on the image signal output from, the DA converter circuit 524 can be provided at the previous stage to the pixel portion 500. Examples of circuits performing signal processing include a buffer and a level shifter.

Next, operation of the scan line driver circuit 510 will be described. The scan line driver circuit 510 generates a selection signal the pulse of which sequentially shifts and inputs the selection signal to a plurality of scan lines to select pixels row by row. When a pixel is selected by the selection signal, the switching transistor, a gate of which is connected to one of the scan lines, is turned on and an image signal is input to the pixel.

Note that although the pixel portion 500, the scan line driver circuit 510, and the signal line driver circuit 520 may be provided over the same substrate, any of these may be provided over a different substrate.

This embodiment can be implemented in appropriate combination with any of the above embodiments.

Embodiment 4

Figure 9:
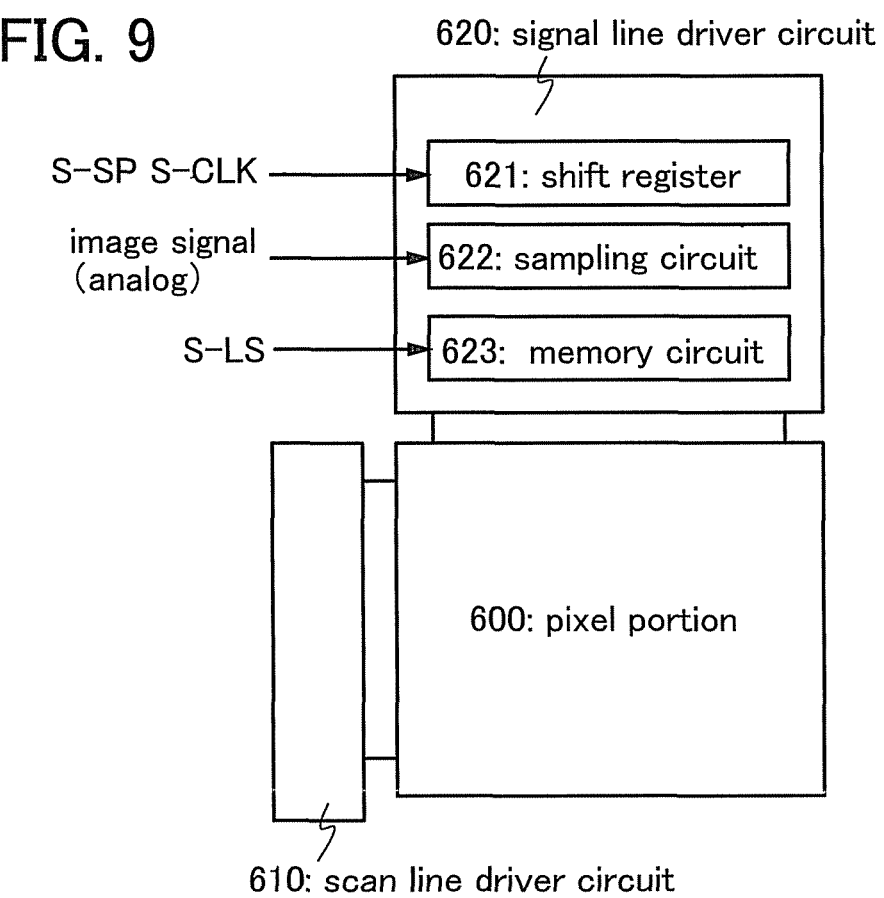
FIG. 9 is a block diagram of an image display portion.

In this embodiment, an example of a specific configuration of an image display portion included in a display device according to one embodiment of the present invention is described. FIG. 9 is a block diagram of the image display portion in this embodiment as an example. Note that in the block diagram of FIG. 9, circuits in the image display portion are classified by their functions and independent blocks are illustrated. However, it is difficult to classify actual circuits by their functions completely and, in some cases, one circuit has a plurality of functions.

The display device according to one embodiment of the present invention shown in FIG. 9 includes a pixel portion 600 having a plurality of pixels, a scan line driver circuit 610 for selecting pixels row by row, and a signal line driver circuit 620 for controlling the input of image signals to pixels in a selected line.

The signal line driver circuit 620 includes at least a shift register 621, a sampling circuit 622, and a memory circuit 623 which can store an analog signal. The clock signal S-CLK and the start pulse signal S-SP are input to the shift register 621. The shift register 621 generates a timing signal whose pulse sequentially shifts in accordance with the clock signal S-CLK and the start pulse signal S-SP and inputs the timing signal to the sampling circuit 622. The sampling circuit 622 samples image signals for one row period, which are input to the signal line driver circuit 620, in accordance with the input timing signal. When all the image signals for one row period are sampled, the sampled image signals are output and stored all at once to the memory circuit 623 in accordance with the latch signal S-LS. The image signals stored in the memory circuit 623 is input to the pixel portion 600 through the signal line.

Note that in this embodiment, an example is described in which all the image signals for one row period are sampled in the sampling circuit 622 and then, the sampled image signals are input all at once to the memory circuit 623 at the subsequent stage; however, one embodiment of the present invention is not limited thereto. In the sampling circuit 622, every time an image signal corresponding to each pixel is sampled, the sampled image signal may be input to the memory circuit 623 at the subsequent stage without waiting for one row period to finish.

In addition, image signals may be sampled for one pixel at one time serially after completion of sampling of video signals for another pixel, or pixels in one row may be divided into several groups and image signals may be sampled with respect to each pixel corresponding in one group at the same time.

Note that in FIG. 9, although the pixel portion 600 is directly connected to the memory circuit 623 at the subsequent stage, one embodiment of the present invention is not limited thereto. A circuit which processes the analog image signal output from the memory circuit 623 can be provided in the previous stage to the pixel portion 600. Examples of circuits performing signal processing include a buffer which can shape a waveform.

Then, when an image signal is input to the pixel portion 600 from the memory circuit 623, the sampling circuit 622 can sample an image signal corresponding to the next row period again at the same time.

Next, operation of the scan line driver circuit 610 will be described. The sacn line driver circuit 610 generates a selection signal the pulse of which sequentially shifts and inputs the selection signal to a plurality of scan lines to select pixels row by row. When a pixel is selected by the selection signal, the switching transistor, a gate of which is connected to one of the scan lines, is turned on and an image signal is input to the pixel.

Note that although the pixel portion 600, the scan line driver circuit 610, and the signal line driver circuit 620 may be provided over the same substrate, any of these may be provided over a different substrate.

This embodiment can be implemented in appropriate combination with any of the above embodiments.

Embodiment 5

In this embodiment, cross-sectional structures of a transistor and a light emitting element of a pixel included in a display device according to one embodiment of the present invention will be described. In this embodiment, a cross-sectional structure of a pixel in the case where a transistor for driving a light-emitting element is an n-channel transistor is described with reference to FIGS. 10A to 10C. Note that, although FIGS. 10A to 10C shows the case where a pixel electrode is a cathode and a common electrode is an anode, the pixel electrode may be an anode and the common electrode may be a cathode as well.

Figure 10A:
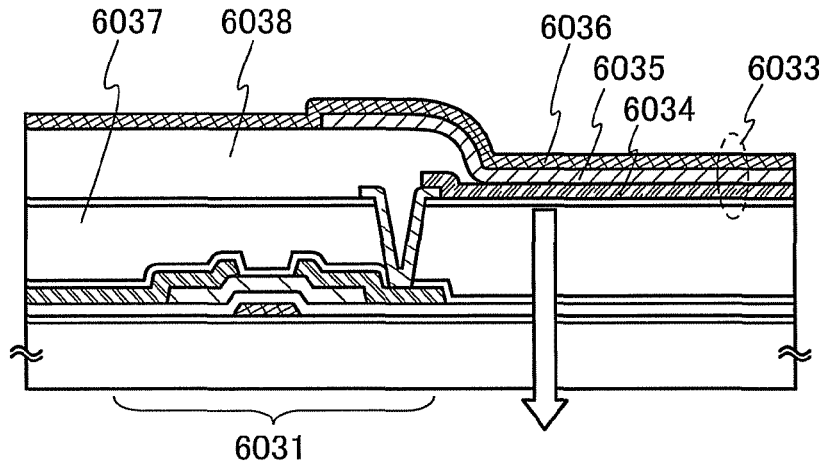
FIGS. 10A to 10C are diagrams showing cross-sectional structures of pixels.
Figure 10B:
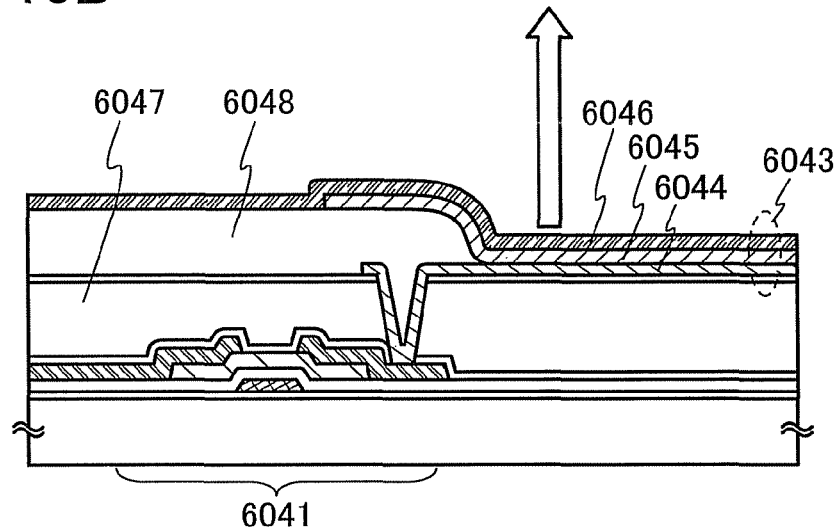
Figure 10C:
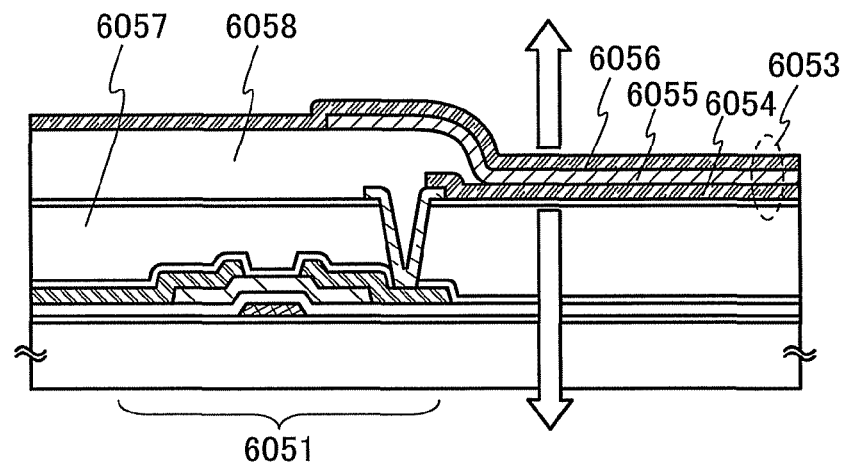

A cross-sectional view of a pixel in the case where a transistor 6031 is an n-channel transistor, and light emitted from a light-emitting element 6033 is extracted from a pixel electrode 6034 side is illustrated in FIG. 10A. The transistor 6031 is covered with an insulating film 6037, and over the insulating film 6037, a bank 6038 having an opening is formed. In the opening of the bank 6038, the pixel electrode 6034 is partially exposed, and the pixel electrode 6034, an electroluminescent layer 6035, and a common electrode 6036 are sequentially stacked in the opening.

The pixel electrode 6034 is formed of a material or to a thickness to transmit light, and can be formed of a material having a low work function of a metal, an alloy, an electrically conductive compound, a mixture thereof, or the like. Specifically, an alkaline metal such as Li or Cs, an alkaline earth metal such as Mg, Ca, or Sr, an alloy containing such metals (e.g., Mg:Ag, Al:Li, or Mg:In), a compound of such materials (e.g., calcium fluoride or calcium nitride), or a rare-earth metal such as Yb or Er can be used. Further, in the case where an electron injection layer is provided, another conductive film such as an aluminum layer may be used as well. Then, the pixel electrode 6034 is formed to a thickness to transmit light (preferably, about 5 nm to 30 nm). Furthermore, the sheet resistance of the pixel electrode 6034 may be suppressed by formation of a light-transmitting conductive layer of a light-transmitting oxide conductive material so as to be in contact with and over or under the above-described conductive film with a thickness to transmit light. Alternatively, the pixel electrode 6034 may be formed of only a conductive film of another light-transmitting oxide conductive material such as indium tin oxide (ITO), zinc oxide (ZnO), indium zinc oxide (IZO), or gallium-doped zinc oxide (GZO). Furthermore, a mixture in which zinc oxide (ZnO) is mixed at 2% to 20% in indium tin oxide including ITO and silicon oxide (hereinafter referred to as ITSO) or in indium oxide including silicon oxide may be used as well. Graphene or the like may also be used for the pixel electrode 6034. In the case of using the light-transmitting oxide conductive material, it is preferable to provide an electron injection layer in the electroluminescent layer 6035.

The common electrode 6036 is formed of a material and to a thickness to reflect or shield light, and can be formed of a material suitable for being used as an anode. For example, a single-layer film including one or more of titanium nitride, zirconium nitride, titanium, tungsten, nickel, platinum, chromium, silver, aluminum, and the like, a stacked layer of a titanium nitride film and a film including aluminum as a main component, a three-layer structure of a titanium nitride film, a film including aluminum as a main component, and a titanium nitride film, or the like can be used for the common electrode 6036.

The electroluminescent layer 6035 is formed using a single layer or a plurality of layers. When the electroluminescent layer 6035 is formed with a plurality of layers, these layers can be classified into a hole injection layer, a hole transport layer, a light-emitting layer, an electron transport layer, an electron injection layer, and the like in view of the carrier transporting property. In the case where the electroluminescent layer 6035 includes at least one of the hole injection layer, the hole transport layer, the electron transport layer, and the electron injection layer in addition to the light-emitting layer, the electron injection layer, the electron transport layer, the light-emitting layer, the hole transport layer, and the hole injection layer are sequentially stacked over the pixel electrode 6034 in this order. Note that the boundary between each layer is not necessarily clear, and there may be a case where the boundary is unclear since a material for forming each layer is mixed with each other. Each layer can be formed with an organic material or an inorganic material. As the organic material, any of a high molecular compound, a medium molecular compound, and a low molecular compound can be used. Note that the medium molecular weight material corresponds to a low polymer in which the number of repetitions of a structural unit (the degree of polymerization) is about 2 to 20. A distinction between a hole injection layer and a hole transport layer is not always distinct, which is the same as in the sense that a hole transporting property (hole mobility) is an especially important characteristic. A layer being in contact with the anode is referred to as a hole injection layer and a layer being in contact with the hole injection layer is referred to as a hole transport layer for convenience. The same is also true for the electron transport layer and the electron injection layer; a layer being in contact with the cathode is referred to as an electron injection layer and a layer being in contact with the electron injection layer is referred to as an electron transport layer. In some cases, the light-emitting layer also functions as the electron transport layer, and it is therefore referred to as a light-emitting electron transport layer, too.

In the case of the pixel shown in FIG. 10A, light emitted from the light-emitting element 6033 can be extracted from the pixel electrode 6034 side as shown by a hollow arrow.

Next, a cross-sectional view of a pixel in the case where a transistor 6041 is an n-channel transistor, and light emitted from a light-emitting element 6043 is extracted from a common electrode 6046 side is illustrated in FIG. 10B. The transistor 6041 is covered with an insulating film 6047, and over the insulating film 6047, a bank 6048 having an opening is formed. In the opening of the bank 6048, a pixel electrode 6044 is partially exposed, and the pixel electrode 6044, an electroluminescent layer 6045, and the common electrode 6046 are sequentially stacked in the opening.

The pixel electrode 6044 is formed of a material and to a thickness to reflect or shield light, and can be formed of a material having a low work function of a metal, an alloy, an electrically conductive compound, a mixture thereof, or the like. Specifically, an alkaline metal such as Li or Cs, an alkaline earth metal such as Mg, Ca, or Sr, an alloy containing such metals (e.g., Mg:Ag, Al:Li, or Mg:In), a compound of such materials (e.g., calcium fluoride or calcium nitride), or a rare-earth metal such as Yb or Er can be used. Further, in the case where an electron injection layer is provided, another conductive film such as an aluminum layer may be used as well.

The common electrode 6046 is formed of a material or to a thickness to transmit light, and formed of a material suitable for being used as an anode. For example, another light-transmitting oxide conductive material such as indium tin oxide (ITO), zinc oxide (ZnO), indium zinc oxide (IZO), or gallium-doped zinc oxide (GZO) can be used for the common electrode 6046. Further, a mixture in which zinc oxide (ZnO) is mixed at 2% to 20% in ITSO or in indium oxide including silicon oxide may be used as well for the common electrode 6046. Grapheme or the like may also be used for the common electrode 6046. Furthermore, a single-layer film including one or more of titanium nitride, zirconium nitride, titanium, tungsten, nickel, platinum, chromium, silver, aluminum, and the like, a stacked layer of a titanium nitride film and a film including aluminum as a main component, a three-layer structure of a titanium nitride film, a film including aluminum as a main component, and a titanium nitride film, or the like can be used for the common electrode 6046. However, in the case of using a material other than the light-transmitting oxide conductive material, the common electrode 6046 is formed to a thickness to transmit light (preferably, about 5 nm to 30 nm).

The electroluminescent layer 6045 can be formed in a manner similar to the electroluminescent layer 6035 of FIG. 10A.

In the case of the pixel shown in FIG. 10B, light emitted from the light-emitting element 6043 can be extracted from the common electrode 6046 as shown by a hollow arrow.

Next, a cross-sectional view of a pixel in the case where a transistor 6051 is an n-channel transistor, and light emitted from a light-emitting element 6053 is extracted from a pixel electrode 6054 side and a common electrode 6056 side is illustrated in FIG. 10C. The transistor 6051 is covered with an insulating film 6057, and over the insulating film 6057, a bank 6058 having an opening is formed. In the opening of the bank 6058, the pixel electrode 6054 is partially exposed, and the pixel electrode 6054, an electroluminescent layer 6055, and the common electrode 6056 are sequentially stacked in the opening.

The pixel electrode 6054 can be formed in a manner similar to that of the pixel electrode 6034 of FIG. 10A. The common electrode 6056 can be found in a manner similar to the common electrode 6046 of FIG. 10B. The electroluminescent layer 6055 can be formed in the same manner as the electroluminescent layer 6035 in FIG. 10A.

In the case of the pixel shown in FIG. 10C, light emitted from the light-emitting element 6053 can be extracted from the pixel electrode 6054 side and the common electrode 6056 side as shown by hollow arrows.

This embodiment can be implemented in appropriate combination with any of the above embodiments.

Embodiment 6

In this embodiment, a structure of a transistor using an oxide semiconductor film is described.

Figure 11A:
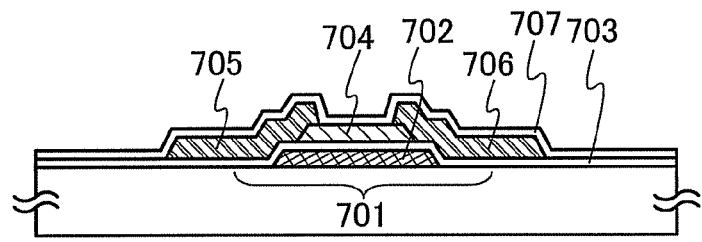
FIGS. 11A to 11E are diagrams showing cross-sectional structures of transistors.

A transistor 701 shown in FIG. 11A is a bottom gate transistor having a channel-etched structure.

The transistor 701 includes a gate electrode 702 formed over an insulating surface, a gate insulating film 703 over the gate electrode 702, an oxide semiconductor film 704 which is over the gate insulating film 703 and overlaps with the gate electrode 702, and a conductive film 705 and a conductive film 706 formed over the oxide semiconductor film 704. The transistor 701 may further include an insulating film 707 formed over the oxide semiconductor film 704 and the conductive film 705 and the conductive film 706.

Note that the transistor 701 shown in FIG. 11A may further include a back-gate electrode which is over the insulating film 707 and which is present in a portion overlapping with the oxide semiconductor film 704.

Figure 11B:
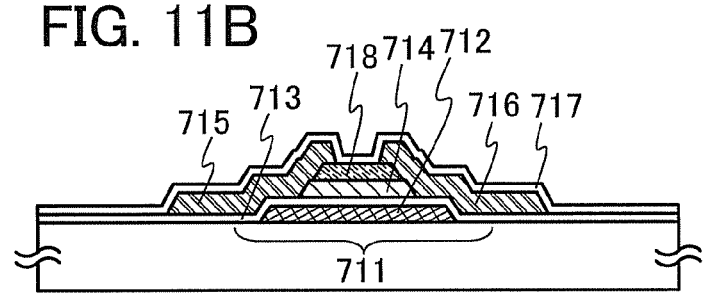

A transistor 711 shown in FIG. 11B is a channel-protective bottom-gate transistor.

The transistor 711 includes a gate electrode 712 formed over an insulating surface, a gate insulating film 713 over the gate electrode 712, an oxide semiconductor film 714 which is over the gate insulating film 713 and overlaps with the gate electrode 712, a channel protective film 718 formed over the oxide semiconductor film 714, and a conductive film 715 and a conductive film 716 formed over the oxide semiconductor film 714. The transistor 711 may further include an insulating film 717 formed over the channel protective film 718, the conductive film 715, and the conductive film 716.

The transistor 711 shown in FIG. 11B may further include a back-gate electrode formed over the insulating film 717 in a portion which overlaps with the oxide semiconductor film 714.

The channel protective film 718 can prevent the portion of the oxide semiconductor film 714, which serves as a channel formation region, from being damaged in a subsequent step (for example, reduction in thickness due to plasma or an etchant in etching). Consequently, reliability of the transistor 711 can be improved.

Figure 11C:
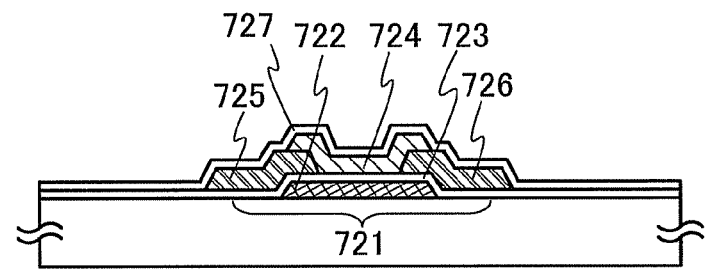

A transistor 721 shown in FIG. 11C is a bottom-contact bottom-gate transistor.

The transistor 721 includes a gate electrode 722 over an insulating surface; a gate insulating film 723 over the gate electrode 722; a conductive film 725 and a conductive film 726 over the gate insulating film 723; and an oxide semiconductor film 724 which overlaps with the gate insulating film 723 and overlaps with the gate electrode 722 and which is formed over the conductive film 725 and the conductive film 726. The transistor 721 may further include an insulating film 727 formed over the conductive film 725, the conductive film 726, and the oxide semiconductor film 724.

The transistor 721 shown in FIG. 11C may further include a back-gate electrode formed over the insulating film 727 in a portion which overlaps with the oxide semiconductor film 724.

Figure 11D:
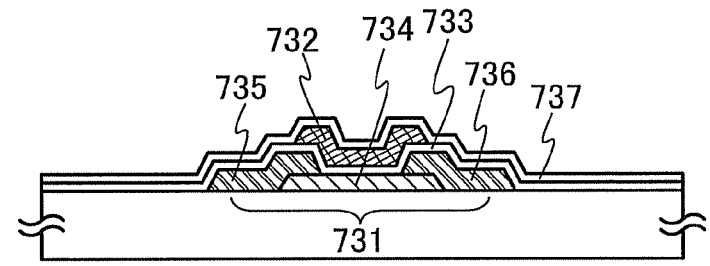

A transistor 731 shown in FIG. 11D is a top-contact top-gate transistor.

The transistor 731 includes an oxide semiconductor film 734 over an insulating surface; a conductive film 735 and a conductive film 736 over the oxide semiconductor film 734; a gate insulating film 733 over the oxide semiconductor film 734, the conductive film 735, and the conductive film 736; a gate electrode 732 which overlaps with the gate insulating film 733 and overlaps with the oxide semiconductor film 734. The transistor 731 may further include an insulating film 737 over the gate electrode 732.

Figure 11E:
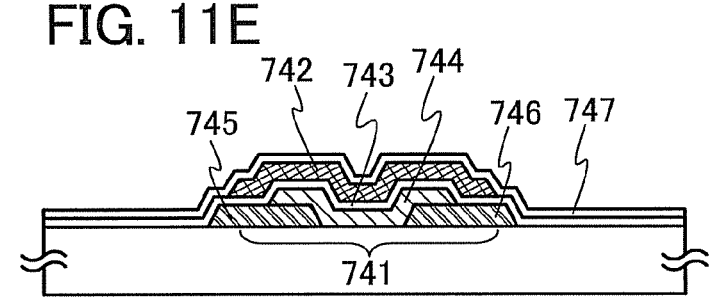

A transistor 741 shown in FIG. 11E is a bottom-contact top-gate transistor.

The transistor 741 includes a conductive film 745 and a conductive film 746 formed over an insulating surface, an oxide semiconductor film 744 formed over the conductive film 745 and the conductive film 746, a gate insulating film 743 formed over the oxide semiconductor film 744, the conductive film 745, and the conductive film 746, and a gate electrode 742 which is over the gate insulating film 743 and which overlaps with the oxide semiconductor film 744. The transistor 741 may further include an insulating film 747 formed over the gate electrode 742.

In the cases shown in FIGS. 11A to 11E, conductive films to be the conductive films 705 and 706, the conductive films 715 and 716, the conductive films 725 and 726, the conductive films 735 and 736, and the conductive films 745 and 746 may be films of any of the following materials: an element selected from aluminum, chromium, copper, tantalum, titanium, molybdenum, or tungsten; an alloy including any of these elements; an alloy including the above elements in combination; and the like. A film of a refractory metal such as chromium, tantalum, titanium, molybdenum, or tungsten may be stacked over or below a metal film of aluminum, copper, or the like. Aluminum or copper is preferably combined with a refractory metal material so as to avoid a heat resistance problem and a corrosive problem. As the refractory metal material, molybdenum, titanium, chromium, tantalum, tungsten, neodymium, scandium, yttrium, or the like can be used.

An oxide semiconductor film formed by sputtering or the like contains a large amount of moisture or hydrogen (including a hydroxyl group) as an impurity in some cases. Moisture or hydrogen easily forms a donor level and thus serves as an impurity in the oxide semiconductor. Therefore, in the cases shown in FIGS. 11A to 11E, in order to reduce impurities such as moisture or hydrogen in the oxide semiconductor films 704, 714, 724, 734, and 744 (hereinafter each simply called oxide semiconductor films) (dehydration or dehydrogenation), the oxide semiconductor films are preferably subjected to heat treatment in a reduced pressure atmosphere, an atmosphere of an inert gas such as nitrogen or a rare gas, an oxygen gas atmosphere, or an ultra dry air atmosphere (the moisture amount is less than or equal to 20 ppm (−55° C. by conversion into a dew point), preferably less than or equal to 1 ppm, more preferably less than or equal to 10 ppb, in the case where measurement is performed with the use of a dew point meter of a cavity ring down laser spectroscopy (CRDS) system).

With the heat treatment on the oxide semiconductor film, moisture or hydrogen in the oxide semiconductor film can be eliminated. Specifically, heat treatment may be performed at a temperature higher than or equal to 250° C. and lower than or equal to 750° C., preferably higher than or equal to 400° C. and lower than the strain point of a substrate. For example, heat treatment may be performed at 500° C. for a period longer than or equal to about 3 minutes and shorter than or equal to 6 minutes. For the heat treatment, an RTA method enables dehydration or dehydrogenation to be performed in a short period of time; therefore, the treatment can be performed even at a temperature higher than the strain point of a glass substrate.

The heat treatment apparatus is not limited to an electric furnace, and may have a device for heating an object by heat conduction or heat radiation from a heating element such as a resistance heating element. For example, an RTA (rapid thermal anneal) apparatus such as a GRTA (gas rapid thermal anneal) apparatus or an LRTA (lamp rapid thermal anneal) apparatus can be used. The LRTA apparatus is an apparatus for heating an object by radiation of light (an electromagnetic wave) emitted from a lamp such as a halogen lamp, a metal halide lamp, a xenon arc lamp, a carbon arc lamp, a high pressure sodium lamp, or a high pressure mercury lamp. The GRTA apparatus is an apparatus for heat treatment using a high-temperature gas. As the gas, an inert gas which does not react with an object by heat treatment, like nitrogen or a rare gas such as argon is used.

In the heat treatment, it is preferable that moisture, hydrogen, and the like be not contained in nitrogen or the rare gas such as helium, neon, or argon. Alternatively, the purity of nitrogen or the rare gas such as helium, neon, or argon which is introduced into the heat treatment apparatus is preferably greater than or equal to 6 N (99.9999%), further preferably greater than or equal to 7 N (99.99999%) (i.e., the impurity concentration is preferably less than or equal to 1 ppm, further preferably less than or equal to 0.1 ppm).

Note that it has been pointed out that an oxide semiconductor is insensitive to impurities, there is no problem when a considerable amount of metal impurities is contained in the film, and therefore, soda-lime glass which contains a large amount of alkali metal such as sodium and is inexpensive can also be used (Kamiya, Nomura, and Hosono, "Carrier Transport Properties and Electronic Structures of Amorphous Oxide Semiconductors: The present status", *KOTAI BUTSURI (SOLID STATE PHYSICS)*, 2009, Vol. 44, pp. 621633). However, such a statement is improper. Alkali metal is not a constituent element of an oxide semiconductor, and thus is an impurity. Alkaline earth metal is also impurity in the case where alkaline earth metal is not a constituent element of an oxide semiconductor. Among alkali metals, in particular, Na becomes Na$^+$ when an insulating film in contact with the oxide semiconductor film is an oxide and Na diffuses into the insulating layer. In addition, in the oxide semiconductor film, Na cuts or enters a bond between metal and oxygen which are constituent elements of an oxide semiconductor. As a result, for example, deterioration of characteristics of the transistor, such as change to a normally-on state of the transistor due to shift of a threshold voltage in the negative direction, or reduction in mobility, occurs. In addition, variation in characteristics occurs. Such deterioration of characteristics of the transistor and variation in characteristics due to the impurity remarkably appear when the hydrogen concentration in the oxide semiconductor film is very low. Therefore, in the case where the hydrogen concentration in the oxide semiconductor film is equal to or less than $5\times10^{19}$ cm$^3$, particularly equal to or less than $5\times10^{18}$ cm$^3$, it is preferable to reduce the concentration of the above impurity as much as possible. Specifically, it is preferable that the measurement value of a Na concentration by secondary ion mass spectrometry be less than or equal to $5\times10^{16}$/cm$^3$, further preferably less than or equal to $1\times10^{16}$/cm$^3$, still further preferably less than or equal to $1\times10^{15}$/cm$^3$. In a similar manner, it is preferable that the measurement value of a Li concentration be less than or equal to $5\times10^{15}$/cm$^3$, further preferably less than or equal to $1\times10^{15}$/cm$^3$. In a similar manner, it is preferable that the measurement value of a K concentration be less than or equal to $5\times10^{15}$/cm$^3$, further preferably less than or equal to $1\times10^{15}$/cm$^3$.

Reducing the hydrogen concentration in the oxide semiconductor films to make the oxide semiconductor films highly purified can achieve the stability of the oxide semiconductor films. In addition, heat treatment at a temperature lower than or equal to the glass transition temperature makes it possible to form an oxide semiconductor film with a wide bandgap in which the density of carriers generated due to a hydrogen defect is low. Therefore, the transistor can be manufactured using a large-sized substrate, thereby increasing the productivity. In addition, by using the oxide semiconductor film in which the hydrogen concentration is reduced and the purity is improved, a transistor having a high withstand voltage and an extremely small off-state current can be manufactured. That heat treatment can be performed any time after the oxide semiconductor film is deposited.

An inorganic material containing oxygen (silicon oxide, silicon nitride oxide, silicon oxynitride, aluminum oxide, aluminum oxynitride, or the like) can be used for insulating films which are in contact with the oxide semiconductor film 704, such as the gate insulating film 703, the insulating film 707, the gate insulating film 713, the gate insulating film 723, the insulating film 727, the gate insulating film 733, and the gate insulating film 743. By using the inorganic material containing oxygen for the insulating film, even when oxygen deficiency is generated in the oxide semiconductor film owing to heat treatment for reducing moisture or hydrogen, oxygen can be supplied from the insulating film to the oxide semiconductor film to reduce the oxygen deficiency which serves as a donor, so that a structure which satisfies the stoichiometric composition ratio can be obtained. Accordingly, the channel formation region can be made to be close to an i-type and variation in electrical characteristics due to the oxygen deficiency of the transistors 701, 711, 721, 731, and 741 can be reduced, which results in improvement of the electrical characteristics.

Insulating films which are in contact with the oxide semiconductor film 704, such as the gate insulating film 703, the insulating film 707, the gate insulating film 713, the gate insulating film 723, the insulating film 727, the gate insulating film 733, and the gate insulating film 743 may be formed using an insulating material containing an element that belongs to Group 13 and oxygen. Since many oxide semiconductors contain a Group 13 element of the periodic table, the Group 13 element fits the oxide semiconductor well. Therefore, by using such an insulating material for the insulating film in contact with the oxide semiconductor film, the state of an interface with the oxide semiconductor film can be kept well.

An insulating material containing a Group 13 element refers to an insulating material including one or more Group 13 elements of the periodic table. As the insulating material containing a Group 13 element, gallium oxide, aluminum oxide, aluminum gallium oxide, a gallium aluminum oxide, and the like are given. Here, aluminum gallium oxide refers to a material in which the amount of aluminum is larger than that of gallium in atomic percent, and gallium aluminum oxide refers to a material in which the amount of gallium is larger than or equal to that of aluminum in atomic percent.

For example, in the case of forming an insulating film in contact with an oxide semiconductor film containing gallium, a material containing gallium oxide may be used for the insulating film, so that the interface characteristics between the oxide semiconductor film and the insulating film can be kept well. For example, with the structure in which the oxide semiconductor film is in contact with the insulating film containing gallium oxide, pileup of hydrogen in the interface between the oxide semiconductor film and the insulating film can be suppressed. The similar effect as the above can be obtained in the case where an element in the same group as a constituent element of the oxide semiconductor is used in the insulating film. For example, it is effective to form the insulating film with the use of a material containing aluminum oxide. Since aluminum oxide is less water-permeable, it is preferable to use the material containing aluminum oxide also in terms of prevention of entry of water to the oxide semiconductor film.

This embodiment can be implemented in combination with the above embodiment.

Example 1

One embodiment of the present invention can provide a three-dimensional display device that displays a bright image with low power consumption without cross talk.

Thus, an electronic appliance using this display device has low power consumption and is capable of displaying clear three-dimensional images.

Figure 12A:
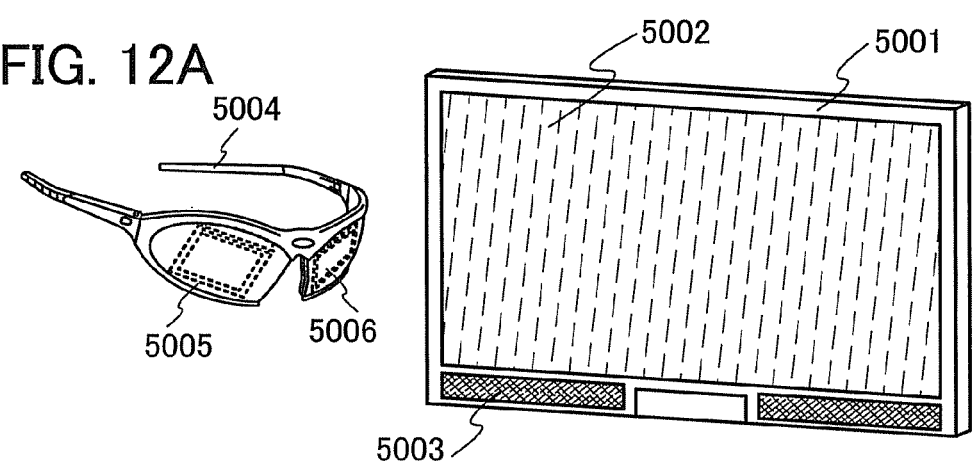
FIGS. 12A to 12C are diagrams of electronic appliances.
Figure 12B:
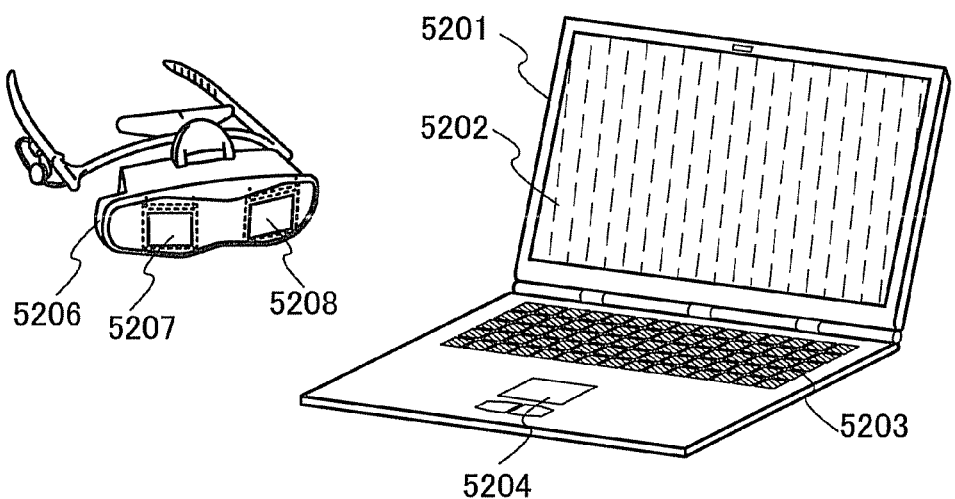
Figure 12C:
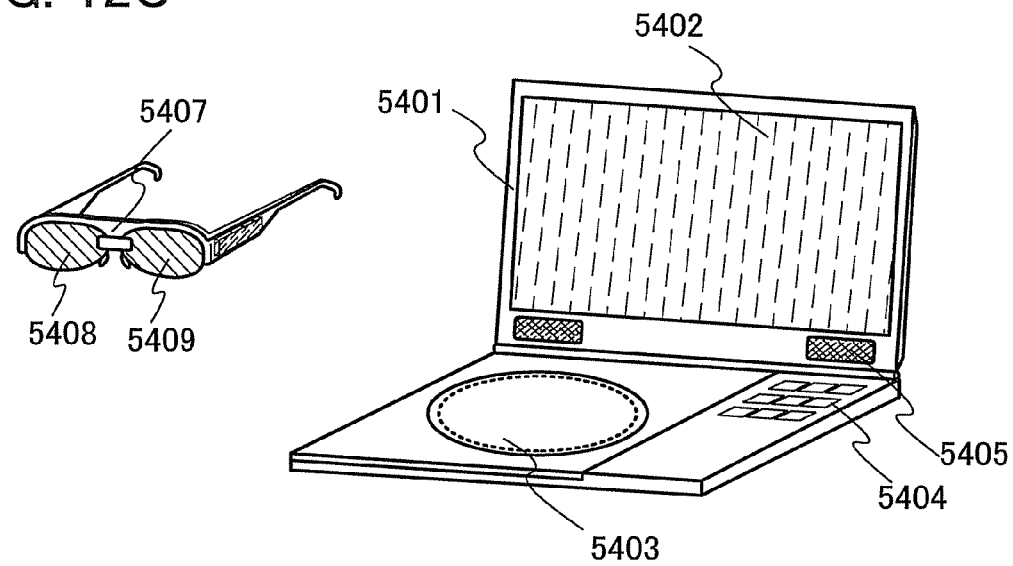

Specifically, the display device according to one embodiment of the present invention can be applied to image display devices, laptop computers, or image reproducing devices provided with recording media (typically devices which reproduce the content of recording media such as DVDs (digital versatile disc) and have displays for displaying the reproduced images). Further, mobile phones, portable game machines, personal digital assistances, e-book readers, and the like can be given. FIGS. 12A to 12C illustrate specific examples of these electronic devices.

FIG. 12A illustrates an image display device including a image-display-portion housing 5001, a display portion 5002 serving as an image display portion, a speaker 5003, and goggles 5004 serving as a light-blocking portion. The goggles 5004 include a right-eye shutter 5005 and a left-eye shutter 5006. Note that a controller that controls the transmittances of the right-eye shutter 5005 and the left-eye shutter 5006 to bring them into synchronism with display of a right-eye image or left-eye image on the display portion 5002 may be provided in either the goggles 5004 or the image-display-portion housing 5001. An image display device using the display device according to one embodiment of the present invention can have low power consumption and can be capable of displaying clear three-dimensional images.

Image display devices include any information image display devices such as those for personal computers, TV broadcast reception, advertisement, or the like.

FIG. 12B illustrates a laptop personal computer including an image-display-portion housing 5201, a display portion 5202 serving as an image display portion, a keyboard 5203, a pointing device 5204, and goggles 5206 serving as a light-blocking portion. The goggles 5206 include a right-eye shutter 5207 and a left-eye shutter 5208. Note that a controller that controls the transmittances of the right-eye shutter 5207 and the left-eye shutter 5208 to bring them into synchronism with display of a right-eye image or left-eye image on the display portion 5202 may be provided in either the goggles 5206 or the image-display-portion housing 5201. A laptop personal computer using the display device according to one embodiment of the present invention can have low power consumption and can be capable of displaying clear three-dimensional images.

FIG. 12C is a mobile image reproducing device (specifically, a DVD player) with recording media, including an image-display-portion housing 5401, a display area 5402 serving as an image display portion, a recording media (such as DVD) reader 5403, control keys 5404, a speaker 5405, and goggles 5407 serving as a light-blocking portion. The goggles 5407 include a right-eye shutter 5408 and a left-eye shutter 5409. Image reproducing devices with recording media include home game machines. Note that a controller that controls the transmittances of the right-eye shutter 5408 and the left-eye shutter 5409 to bring them into synchronism with display of a right-eye image or left-eye image on the display area 5402 may be provided in either the goggles 5407 or the image-display-portion housing 5401. An image reproducing device using the display device according to one embodiment of the present invention can have low power consumption and can be capable of displaying clear three-dimensional images.

As described above, the present invention can be widely applied to and used for electronic devices in a wide variety of fields.

This embodiment can be implemented in appropriate combination with any of the above embodiments.

This application is based on Japanese Patent Application serial No. 2010-203894 filed with Japan Patent Office on Sep. 13, 2010, the entire contents of which are hereby incorporated by reference.

What is claimed is:

1. A display device comprising:
    a pixel portion comprising a plurality of pixels each comprising:
        a light emitting element comprising:
            a pixel electrode;
            a common electrode configured to be supplied with a common potential; and
            an electroluminescent layer between the pixel electrode and the common electrode; and
        a drive transistor controlling a potential of the pixel electrode;
    a light-blocking portion comprising a first shutter and a second shutter;
    a signal source configured to output the common potential; and
    a controller configured to control transmittances of the first shutter and the second shutter and level of the common potential output from the signal source so that either the first shutter or the second shutter is in a light-transmitting state after the common potential becomes a first potential allowing the light emitting element to emit light and then in a light-blocking state before the common potential becomes a second potential not allowing the light emitting element to emit light.

2. The display device according to claim 1, further comprising a switching transistor controlling a supply of an image signal.

3. The display device according to claim 1, wherein the first shutter and the second shutter use a liquid crystal element.

4. The display device according to claim 1, wherein the drive transistor has an active layer of an oxide semiconductor.

5. The display device according to claim 4, wherein the oxide semiconductor is an In—Ga—Zn-based oxide semiconductor.

6. The display device according to claim 4, wherein hydrogen concentration in the active layer is $5 \times 10^{19}/cm^3$ or less.

7. The display device according to claim 2, wherein one of the switching transistor and the drive transistor has an active layer of an oxide semiconductor.

8. A display device comprising:
    a pixel portion comprising a plurality of pixels each comprising:
        a light emitting element comprising:
            a pixel electrode; and
            a common electrode configured to be supplied with a common potential; and
        a drive transistor comprising:
            a gate electrode;
            a first terminal supplied with a power supply potential; and
            a second terminal electrically connected to the pixel electrode;
    a light-blocking portion comprising a first shutter and a second shutter;
    a signal source configured to output the common potential; and
    a controller configured to control transmittances of the first shutter and the second shutter and level of the common potential output from the signal source so that either the first shutter or the second shutter is in a light-transmitting state after the common potential becomes a first potential allowing the light emitting element to emit light and then in a light-blocking state before the common potential becomes a second potential not allowing the light emitting element to emit light.

9. The display device according to claim 8, further comprising:
    a switching transistor comprising:
        a first terminal supplied with an image signal; and
        a second terminal electrically connected to the gate electrode of the drive transistor.

10. The display device according to claim 8, wherein the first shutter and the second shutter use a liquid crystal element.

11. The display device according to claim 8, wherein the drive transistor has an active layer of an oxide semiconductor.

12. The display device according to claim 11, wherein the oxide semiconductor is an In—Ga—Zn-based oxide semiconductor.

13. The display device according to claim 11, wherein hydrogen concentration in the active layer is $5 \times 10^{19}/cm^3$ or less.

14. The display device according to claim 9, wherein one of the switching transistor and the drive transistor has an active layer of an oxide semiconductor.

15. A display device comprising:
    an image display area comprising:
        a pixel comprising a first transistor, a second transistor, a pixel electrode, a common electrode, and an electroluminescent layer, and
        a signal source electrically connected to the common electrode;
        wherein a first terminal of the first transistor is electrically connected to a gate electrode of the second transistor,
        wherein a first terminal of the second transistor is electrically connected to the pixel electrode,
        wherein the electroluminescent layer is provided between the pixel electrode and the common electrode, and
        wherein the signal source is configured to supply a potential to the common electrode;
    a light-blocking portion comprising a first shutter and a second shutter; and
    a controller configured to control transmittances of the first shutter and the second shutter and level of the potential output from the signal source so that either the first shutter or the second shutter is in a light-transmitting state after the potential becomes a first potential allowing the electroluminescent layer to emit light and then in a light-blocking state before the potential becomes a second potential not allowing the electroluminescent layer to emit light.

16. The display device according to claim 15, wherein the first shutter and the second shutter use a liquid crystal element.

17. The display device according to claim 15, wherein one of the first transistor and the second transistor has an active layer of an oxide semiconductor.

18. The display device according to claim 17, wherein the oxide semiconductor is an In—Ga—Zn-based oxide semiconductor.

19. The display device according to claim 17, wherein hydrogen concentration in the active layer is $5 \times 10^{19}/cm^3$ or less.

20. The display device according to claim 15, wherein the controller is included in the light-blocking portion.

21. The display device according to claim 1, wherein the transmittances and the level synchronize with a supply of an image signal to the pixel portion, a display of a right-eye image, and a display of a left-eye image performed in the pixel portion so that the first shutter and the second shutter are in light-blocking states and the common potential becomes the second potential during the supply of the image signal to the pixel portion.

22. The display device according to claim 8, wherein the transmittances and the level synchronize with a supply of an image signal to the pixel portion, a display of a right-eye image, and a display of a left-eye image performed in the pixel portion so that the first shutter and the second shutter are in light-blocking states and the common potential becomes the second potential during the supply of the image signal to the pixel portion.

23. The display device according to claim 15, wherein the controller is configured to control the transmittances of the first shutter and the second shutter and the level so that the first shutter and the second shutter are in light-blocking states and the potential becomes the second potential during a supply of an image signal to the pixel.

24. The display device according to claim 1, wherein the transmittances and the level synchronize with a supply of an image signal to the pixel portion, a display of a right-eye image, and a display of a left-eye image performed in the pixel portion so that either the first shutter or the second shutter becomes the light-transmitting state after the common potential becomes the first potential.

25. The display device according to claim 8, wherein the transmittances and the level synchronize with a supply of an image signal to the pixel portion, a display of a right-eye image, and a display of a left-eye image performed in the pixel portion so that either the first shutter or the second shutter becomes the light-transmitting state after the common potential becomes the first potential.

* * * * *